United States Patent [19]
Bilanin et al.

[11] Patent Number: 5,759,399
[45] Date of Patent: Jun. 2, 1998

[54] HIGH CAPACITY, LOW HEAD LOSS, SUCTION STRAINER FOR NUCLEAR REACTORS

[75] Inventors: Alan J. Bilanin, Princeton; Andrew E. Kaufman, West Windsor, both of N.J.

[73] Assignee: Continuum Dynamics, Inc., Princeton, N.J.

[21] Appl. No.: 780,582

[22] Filed: Jan. 8, 1997

[51] Int. Cl.⁶ .................. G21C 19/307; B01D 29/41; B01D 35/02; B01D 35/027
[52] U.S. Cl. .................. 210/416.1; 210/346; 210/461; 210/486; 376/313
[58] Field of Search .................. 210/461, 486, 210/487, 488, 416.1, 346, 347, 460; 376/313

[56] References Cited

U.S. PATENT DOCUMENTS

| | | |
|---|---|---|
| 2,720,983 | 10/1955 | Kracklauer . |
| 2,978,108 | 4/1961 | Strassheim . |
| 4,376,091 | 3/1983 | Netkowicz . |
| 4,421,646 | 12/1983 | Correge et al. . |
| 4,543,188 | 9/1985 | Okouchi . |
| 4,549,963 | 10/1985 | Jensen et al. . |
| 4,594,162 | 6/1986 | Berger . |
| 4,637,877 | 1/1987 | Hartmann et al. . |
| 4,726,900 | 2/1988 | Keskinen et al. . |
| 4,738,778 | 4/1988 | Taki et al. . |
| 4,783,262 | 11/1988 | Ostreicher et al. . |
| 4,814,093 | 3/1989 | Frykhult . |
| 4,818,402 | 4/1989 | Steiner et al. . |
| 4,842,739 | 6/1989 | Tang . |
| 4,902,420 | 2/1990 | Pall et al. . |
| 5,055,192 | 10/1991 | Artinyan et al. . |
| 5,376,278 | 12/1994 | Salem . |
| 5,413,712 | 5/1995 | Gewiss . |
| 5,426,679 | 6/1995 | Henriksson . |
| 5,453,180 | 9/1995 | Henriksson . |
| 5,520,805 | 5/1996 | Majola . |
| 5,539,790 | 7/1996 | Henriksson . |
| 5,612,983 | 3/1997 | Hendriksson . |

OTHER PUBLICATIONS

"New ideas for cylindrical pipe intakes can help reduce fish and larvae kills" by R.T. Richards, Burns & Roe, Inc., Jun., 1980, edition of Power Magazine, pp. 64–67.

*Primary Examiner*—Thomas M. Lithgow
*Attorney, Agent, or Firm*—Woodbridge & Associates

[57] ABSTRACT

A suction strainer for straining water from the emergency suppression pool of a boiling water reactor includes a plurality of stacked, perforated disks having an internal core with a minimum internal radius r(x) that decreases with increased distance from the intake of the strainer, so that the core has a tapered profile. Internal radius r(x) may vary linearly or exponentially or a combination of both. The stacked, perforated disks each include a first surface that faces in the direction of the intake and a second surface, that faces away from the intake. A circumferential band may connect the first and second surfaces together.

19 Claims, 22 Drawing Sheets

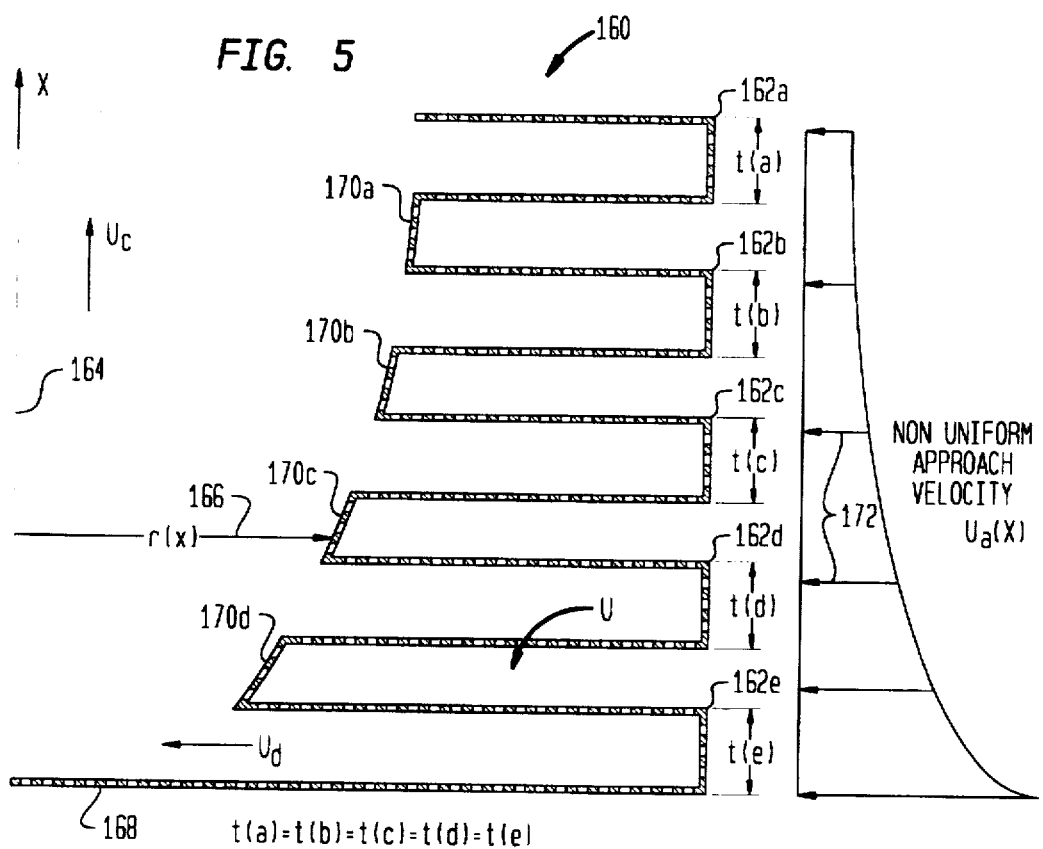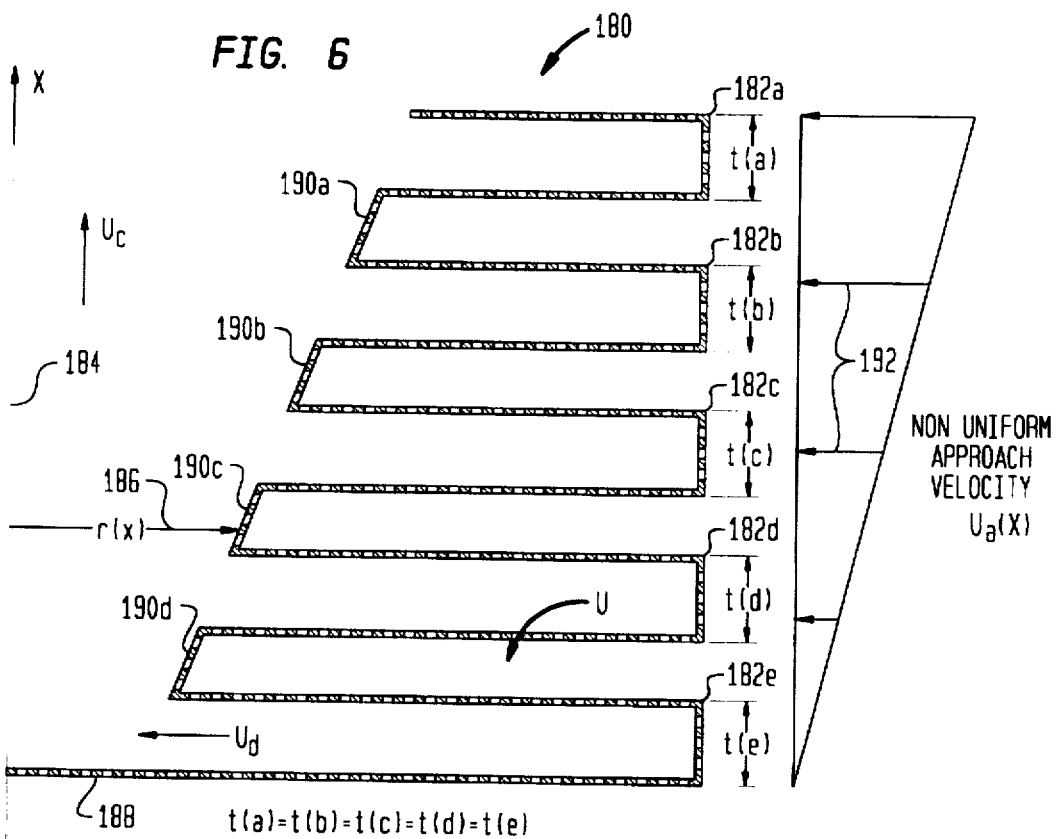

| STATION | X POSITION (IN) | RADIUS (IN) | THICKNESS (IN) |
|---|---|---|---|
| 0 | 1.00 | 0.00 | 3.61 | 1.85 |
| 1 | 2.00 | 3.92 | 4.87 | 1.32 |
| 2 | 3.00 | 7.31 | 5.76 | 1.08 |
| 3 | 4.00 | 10.5 | 6.48 | 0.940 |
| 4 | 5.00 | 13.5 | 7.11 | 0.840 |
| 5 | 6.00 | 16.4 | 7.66 | 0.764 |
| 6 | 7.00 | 19.2 | 8.16 | 0.703 |
| 7 | 8.00 | 22.0 | 8.62 | 0.652 |
| 8 | 9.00 | 24.7 | 9.04 | 0.610 |
| 9 | 10.00 | 27.4 | 9.43 | 0.574 |
| 10 | 11.00 | 30.1 | 9.80 | 0.542 |
| 11 | 12.00 | 32.7 | 10.1 | 0.514 |
| 12 | 13.00 | 35.3 | 10.5 | 0.489 |
| 13 | 14.00 | 37.8 | 10.8 | 0.466 |
| 14 | 15.00 | 40.4 | 11.1 | 0.446 |
| 15 | 16.00 | 42.9 | 11.3 | 0.428 |
| 16 | 17.00 | 45.4 | 11.6 | 0.411 |
| 17 | 18.00 | 47.9 | 11.9 | 0.394 |

FIG. 24B

| x | r(x) | x | r(x) | x | r(x) |
|---|---|---|---|---|---|
| 0.0000 | 0.0000 | 16.768 | 8.1444 | 34.242 | 20.000 |
| 0.0000 | 2.9700 | 18.000 | 8.1444 | 34.484 | 10.741 |
| 1.0000 | 20.000 | 18.360 | 20.000 | 36.000 | 10.741 |
| 2.0004 | 3.9588 | 18.720 | 8.4960 | 36.233 | 20.000 |
| 2.8542 | 20.000 | 20.000 | 8.4960 | 36.466 | 10.970 |
| 3.7080 | 4.7328 | 20.339 | 20.000 | 38.000 | 10.970 |
| 3.9996 | 4.7328 | 20.678 | 8.8272 | 38.224 | 20.000 |
| 4.7010 | 20.000 | 22.000 | 8.8272 | 38.448 | 11.192 |
| 5.4024 | 5.3868 | 22.321 | 20.000 | 40.000 | 11.192 |
| 6.0000 | 5.3868 | 22.642 | 9.1404 | 40.216 | 20.000 |
| 6.6054 | 20.000 | 24.000 | 9.1404 | 40.432 | 11.405 |
| 7.2108 | 5.9592 | 24.304 | 20.000 | 42.000 | 11.405 |
| 8.0004 | 5.9592 | 24.608 | 9.4392 | 42.208 | 20.000 |
| 8.5380 | 20.000 | 26.000 | 9.4392 | 42.416 | 11.610 |
| 9.0756 | 6.4728 | 26.290 | 20.000 | 44.000 | 11.610 |
| 9.9996 | 6.4728 | 26.580 | 9.7236 | 44.201 | 20.000 |
| 10.486 | 20.000 | 28.000 | 9.7236 | 44.402 | 11.808 |
| 10.973 | 6.9408 | 28.276 | 20.000 | 46.000 | 11.808 |
| 12.000 | 6.9408 | 28.552 | 9.9948 | 46.193 | 20.000 |
| 12.446 | 20.000 | 30.000 | 9.9948 | 46.387 | 12.000 |
| 12.892 | 7.3704 | 30.264 | 20.000 | 48.000 | 12.000 |
| 14.000 | 7.3704 | 30.528 | 10.254 | | |
| 14.413 | 20.000 | 32.000 | 10.254 | | |
| 14.825 | 7.7700 | 32.253 | 20.000 | | |
| 16.000 | 7.7700 | 32.506 | 10.502 | | |
| 16.384 | 20.000 | 34.000 | 10.502 | | |

HIGH CAPACITY, LOW HEAD LOSS, SUCTION STRAINER FOR NUCLEAR REACTORS

This application claims the priority of the following two provisional patent applications: Invention entitled "HIGH CAPACITY LOW HEAD LOSS SUCTION STRAINER" filed Apr. 1, 1996, application Ser. No. 60/014,703; and, invention entitled "TAPERED DISH HIGH CAPACITY LOW HEAD LOSS SUCTION STRAINER" filed May 10, 1996, application Ser. No. 60/017,240.

BACKGROUND OF THE INTENTION

1. Field of the Invention

The invention relates to a suction strainer for use on suction lines in nuclear reactors in which the internal radius of the central core decreases with increased distance from the intake of the strainer.

2. Description of Related Art

Two common, prior art suction strainers are illustrated in FIGS. 1A and 1B. Truncated cone strainer 10 includes a perforated surface 12, a center line 14 around x axis 18, and an internal radius r(x) 16 between center line 14 and perforated surface 12.

The truncated cone strainer 10 of FIG. 1A is a relatively inexpensive and simple structure. The performance of the truncated cone strainer 10, however, in terms of the amount of debris it can accumulate and strain, and still maintain low head loss, is limited because its surface area is small in relation to the volume it occupies compared to other strainers.

The stacked disk strainer 20 illustrated in FIG. 1B improves upon the truncated cone strainer of FIG. 1A by providing more surface area to accumulate debris within the same overall strainer volume envelope. The stacked disk strainer 20 includes a perforated surface 22, a center line 24 about x axis 28 and an internal radius r(x) 26 between center line 24 and the innermost surface 26. It is clear that the stacked disk strainer area of the prior art embodiment 20 of FIG. 1B can be made arbitrarily large by decreasing both the distance between the disks and the disk thickness, thereby adding more disks within a given volume. Accordingly, a measure of strainer performance can be obtained by dividing the strainer surface area by the strainer volume, especially when strainer volumes are comparable.

Other strainer designs considered the approach velocity of the fluid in the vicinity of the strainer. Another prior art strainer 30, illustrated in FIG. 2A, demonstrates the fact that the approach velocity is typically greater near the suction pipe intake and drops off rapidly the further one gets from the intake. Strainer 30 includes a perforated, cylindrical outer surface 32, a conical bottom 34, a center line 38 about the x axis and an internal radius r(x) 36 between surface 32 and center line 38. Strainer flange 40 connects to pump suction intake flange 42. Note that the approach velocities $U_a$ 44 are highest closest to flanges 40, 42.

An alternative, prior art strainer 50, illustrated in FIG. 2B, includes inserts which internally modify the nature of the strainer. Strainer 50 includes a perforated surface 52, a conical bottom 54, a center line 58 around the x axis and an internal radius r(x) 56 between the center line 58 and surface 52. Strainer flange 60 attaches to pump suction intake flange 62. A cylindrical insert 66 is located inside of strainer 50. Inserts 66 improve the uniformity of the approach velocity $U_a$ 64, but may introduce other drawbacks.

A useful discussion of prior art strainer designs and performance characteristics can be found in an article entitled "New Ideas for Cylindrical Pipe Intakes Can Help to Reduce Fish and Larvae Kills" by R. T. Richards, Burns & Roe, Inc., published in the June, 1980 edition of POWER MAGAZINE. That article discusses, among other things, the optimal design characteristics of prior art perforated strainers similar to those illustrated in FIGS. 2A and 2B above.

The patent literature also discloses efforts to improve strainers for emergency nuclear cooling pools. See, in particular, U.S. Pat. Nos. 5,453,180 and 5,539,790, both entitled STRAINER DEVICE FOR FILTERING WATER TO AN EMERGENCY COOLING SYSTEM IN A NUCLEAR POWER PLANT and assigned to Vattenfall Utveckling AB, Alvkarleby, Sweden. FIG. 2 of U.S. Pat. No. 5,539,790, in particular, shows a prior art strainer similar to that illustrated as prior art in FIG. 2A of this disclosure.

The following patents describe the general state of the relevant art pertaining to stacked strainers: U.S. Pat. No. 4,421,646 (see, in particular, FIGS. 2–5); U.S. Pat. Nos. 4,726,900; 4,783,262; 4,818,402 (FIGS. 3–13); U.S. Pat. Nos. 4,842,739; 5,055,192; and, 5,520,805. None of the foregoing patents appear to relate to stacked disk strainers having a tapered central core and suitable for use with nuclear reactors.

The following patent disclosures appear to be relevant to corrugated filters: U.S. Pat. Nos. 4,594,162; 5,413,712 and 5,376,278. While multiple disk-like surfaces are described, nevertheless, the structures appear to be substantially different from the present invention and does not address the advantages obtained by a tapered central core.

U.S. Pat. No. 4,738,778 describes a zig-zag filter element which is suitable for certain types of applications but not for nuclear reactor suction lines.

Lastly, the following patents are cited as being relevant only to the issue of specific disk design as might be found, for example, in multiple disk filters: U.S. Pat. No. 4,549,963; 4,637,877, and, 4,902,420.

In summary, none of the prior art, taken individually or in combination, appears to describe a suction strainer suitable for use in nuclear reactors in which the core internal diameter tapers efficiently as the distance from the suction intake increases.

SUMMARY OF THE INVENTION

Briefly described, the invention comprises a multiple disk strainer for use in nuclear reactor emergency suppression pools in which the inner disk radius decreases with distance from the suction intake. The strainer is attached to a suction pump intake pipe and is optimally configured to have minimum head loss and accumulate a maximum amount of debris, within a given volume. Because the internal radius decreases with distance from the intake, a constant fluid flow velocity is maintained throughout the entire central core region. The constant core velocity minimizes head loss, and therefore pressure drop, where velocities are greatest and, hence, the internal fluid flow is most sensitive to irreversible head loss. Surrounding the central core are a plurality of perforated disks varying in internal diameter whose thickness may be constant or may vary with distance from the intake. The perforations, or holes, in each disk are sized to prevent debris from passing into the strainer, but large enough to allow fluid to pass through. The spacing between the disks is generally uniform but may vary depending upon the characteristics of the debris to be strained. Likewise, the outer diameter of the disks is typically constant, but can vary and still maintain a constant core velocity.

The preferred embodiment of the strainer invention comprises a plurality of stacked disks in which the spacing between the disks is uniform and in which the disk thickness increases with distance from the intake while the internal radius of the disk decreases with distance from the intake. The internal disk radius may decrease linearly or exponentially, or a combination of both, as it gets further from the suction intake. The exterior diameters of the disks are preferably uniformly the same, but according to another alternative embodiment, the external diameter of the disks may decrease with increasing distance from the intake. This structure would be most advantageous where it is desired to minimize the load on the suction flange. Another group of alternative embodiments comprehends the use of tapered disks rather than disks of generally uniform thickness.

Because the velocity is substantially constant through the core, it therefore follows that there is no significant pressure drop along the central axis which, in turn, implies that the pressure drop on each disk is substantially the same. This, in turn, allows for substantially the same rate of debris buildup on each disk assembly thereby maximizing the strainer capacity. This feature is important because the strainers are used only for emergency purposes. Insofar as understood, the prior art, when reviewed, either individually or taken in combination, does not appear to disclose or suggest the invention as set forth herein.

The invention may be more fully understood by reference to the following drawings.

BRIEF DESCRIPTION OF THE DRAWINGS

FIG. 5 is an elevated, partial cross-sectional view of an embodiment in which the internal disk radius r(x) decreases exponentially with increased distance from the suction intake.

FIG. 6 is an elevated, partial cross-sectional view of an embodiment in which the internal disk radius r(x) decreases linearly with increased distance from the suction intake.

FIG. 24B is a table of dimensions for the particular embodiment illustrated in FIG. 24A.

DETAILED DESCRIPTION OF THE INVENTION

During the course of this disclosure like numbers will be used to identify like elements according to the different figures which illustrate the invention.

Figure 1A:
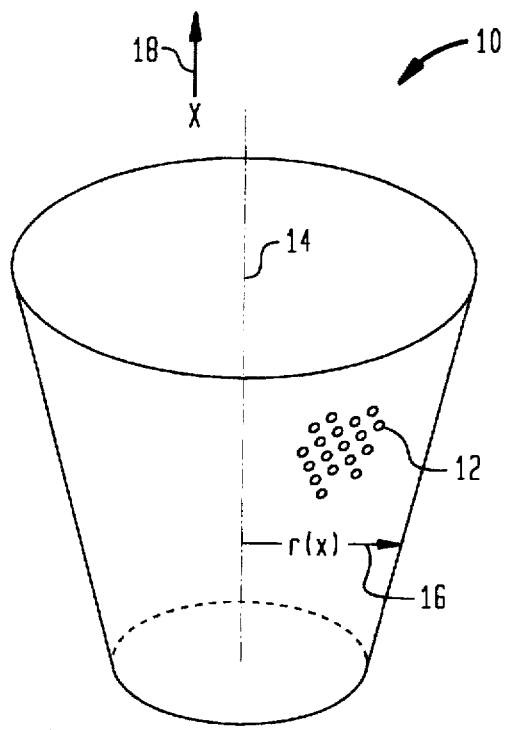
FIG. 1A illustrates a prior art truncated cone strainer.
Figure 1B:
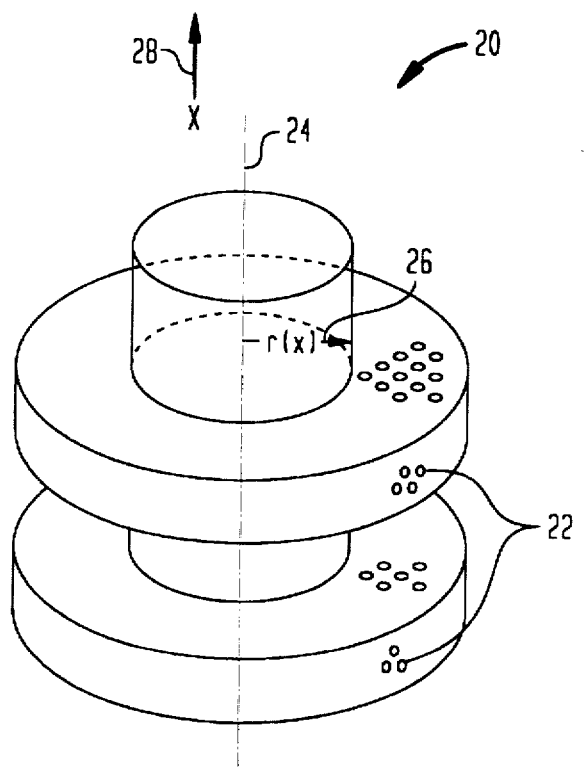
FIG. 1B illustrates a prior art, stacked disk strainer, as currently manufactured, including an inner core having a uniform, constant, internal radius.
Figure 2A:
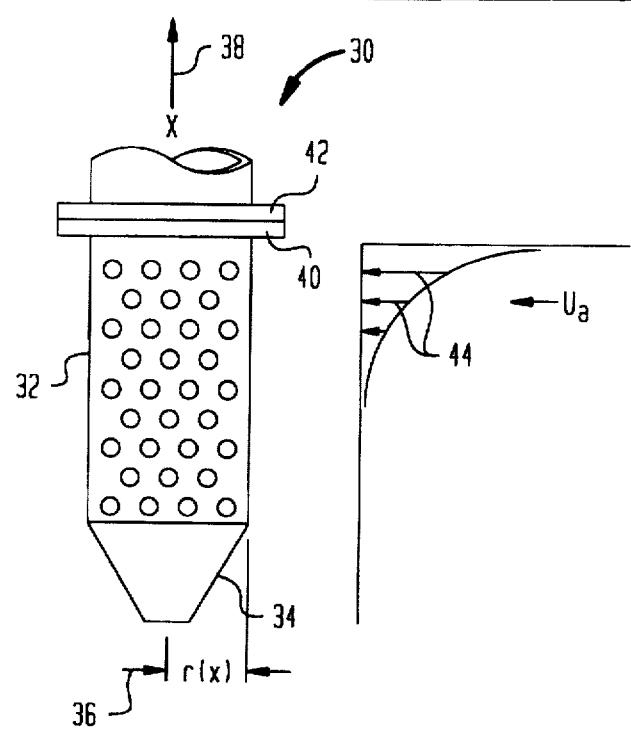
FIG. 2A illustrates a prior art cylindrical strainer and the manner in which the approach velocity $U_a$ varies along the length of the strainer.
Figure 2B:
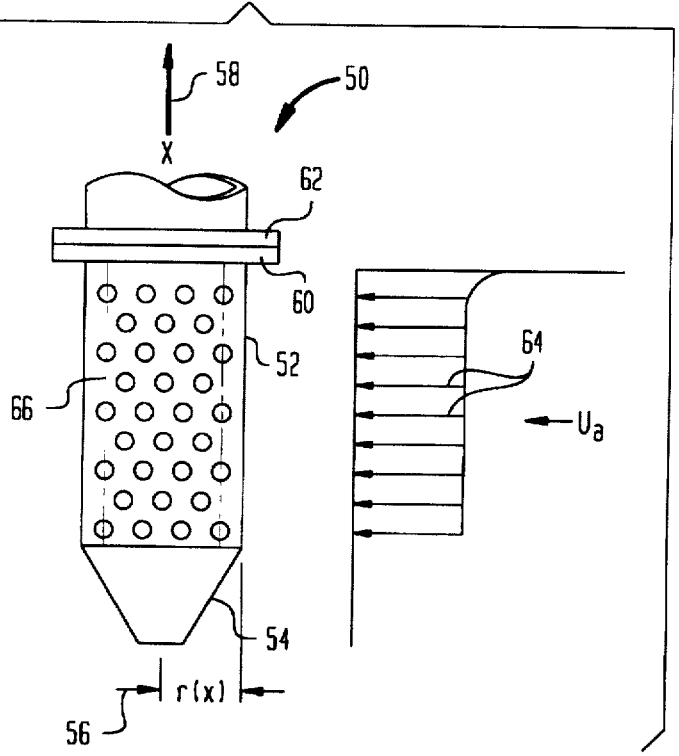
FIG. 2B illustrates another prior art cylindrical strainer, including an insert, which causes the approach velocity $U_a$ to be more uniform along the length of the strainer.
Figure 3A:
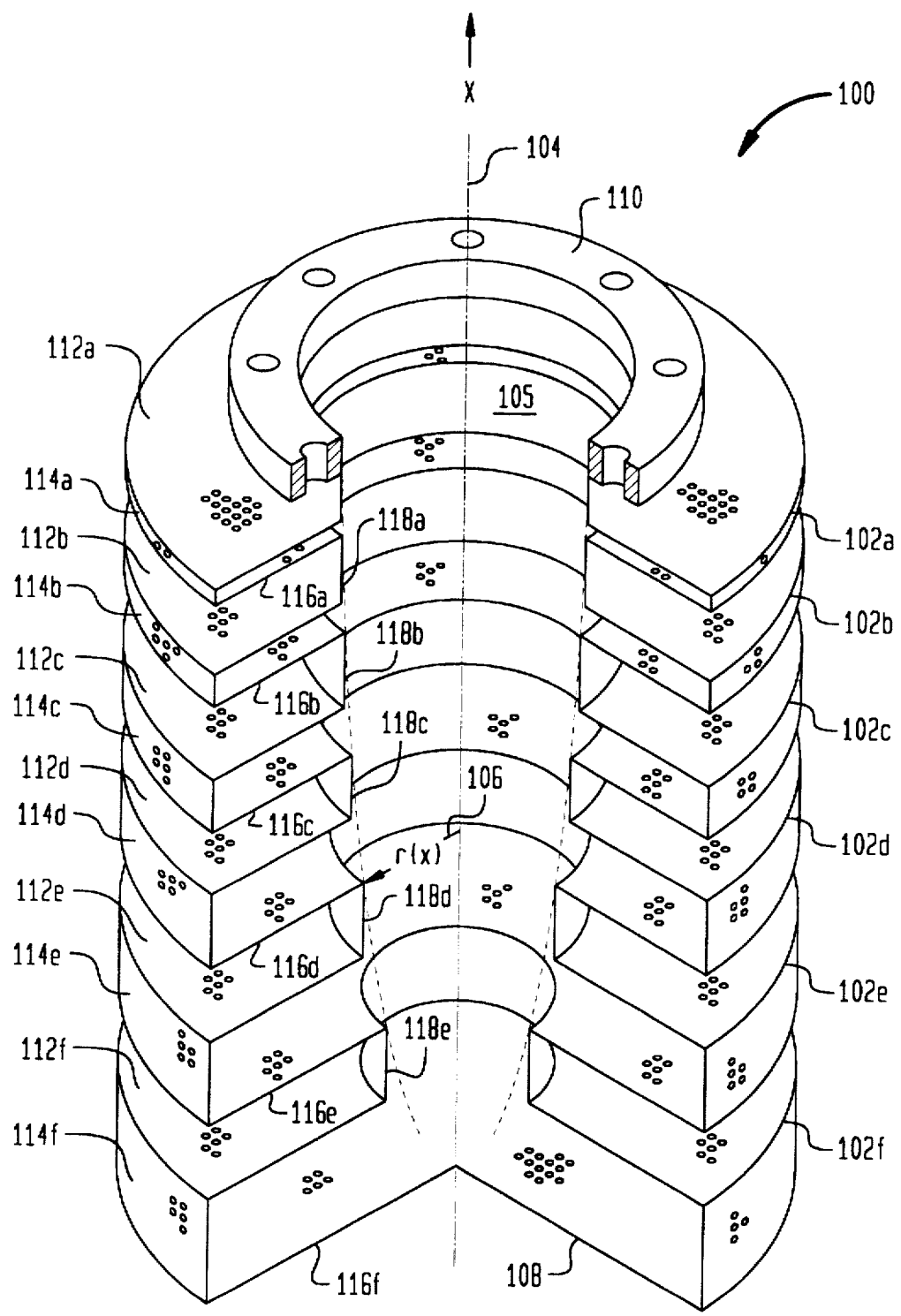
FIG. 3A is a perspective, partial, cross-sectional view of a strainer according to the preferred embodiment of the invention in which the internal radius r(x) decreases with distance from the suction intake and also wherein the thickness of the disks increases with distance from the suction intake while the disk separation remains the same throughout the length of the strainer.
Figure 4A:
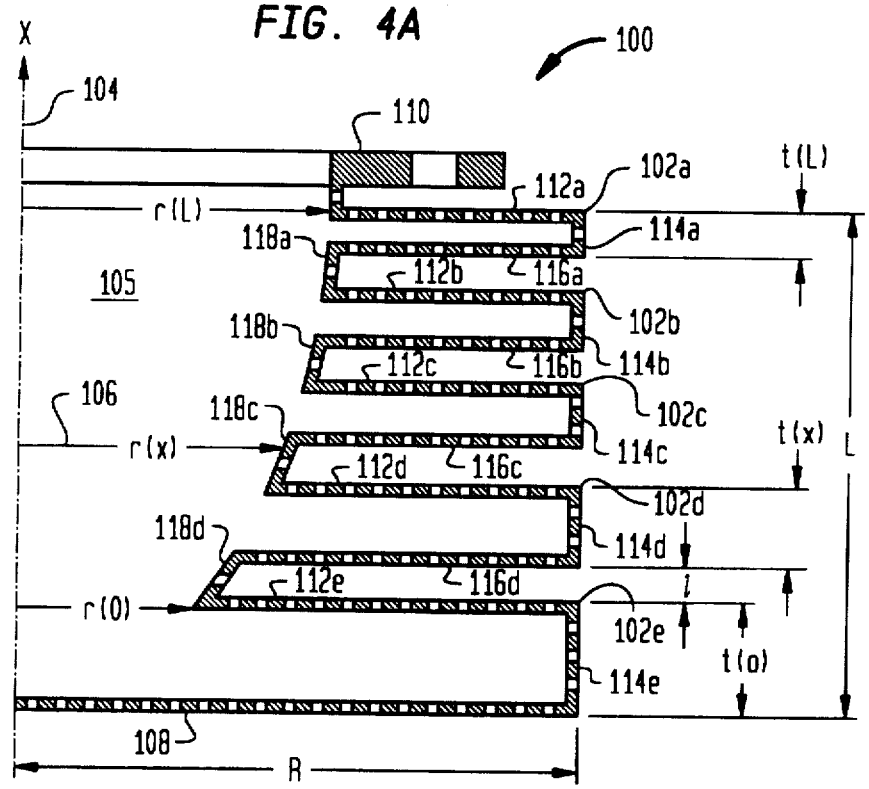
FIG. 4A is an elevated, partial cross-sectional view of the preferred embodiment of the invention shown in FIG. 3A illustrating the parameters employed to describe the invention. Because the preferred embodiment illustrated in FIG. 3A is axis symmetric, only one-half of the cross-section is illustrated.

The preferred embodiment 100 of the suction strainer is illustrated in FIG. 3A. Preferred embodiment 100 comprises a plurality of stacked, perforated disks 102a–102f with varying internal radii r(x) and thickness t(x) as shown in FIG. 4A. Each strainer 100 includes a plurality of stacked disks 102a–102f. Each disk 102a–102f has an associated first forward facing face 112a–112f, a second rearward facing face 116a–116f and an outwardly facing circumferential surface 114a–114f. Each disk 102a–102f includes an inwardly facing surface 118a–118e that separates it from its neighboring disk. Inwardly facing surfaces 118a–118e define a tapered core having a radius r(x) 106 around a central axis 104.

The preferred embodiment 100 has a central core 105 which is symmetrical about center line 104, also referred to as the x axis, because the preferred embodiment 100 is best defined in cylindrical units. Central core 105 is attached by a flange 110 to a conventional suction pump intake at one end and is terminated at the distal end by plate 108. According to the preferred embodiment of the invention, the internal radius r(x) decreases with distance from the suction intake, i.e., strainer flange 110, whereas the thickness of t(x) of each disk 102a–102f increases with distance from the suction intake thereby maximizing the amount of debris that can be accumulated while minimizing strainer head loss within a given overall size or volume envelope.

Figure 3B:
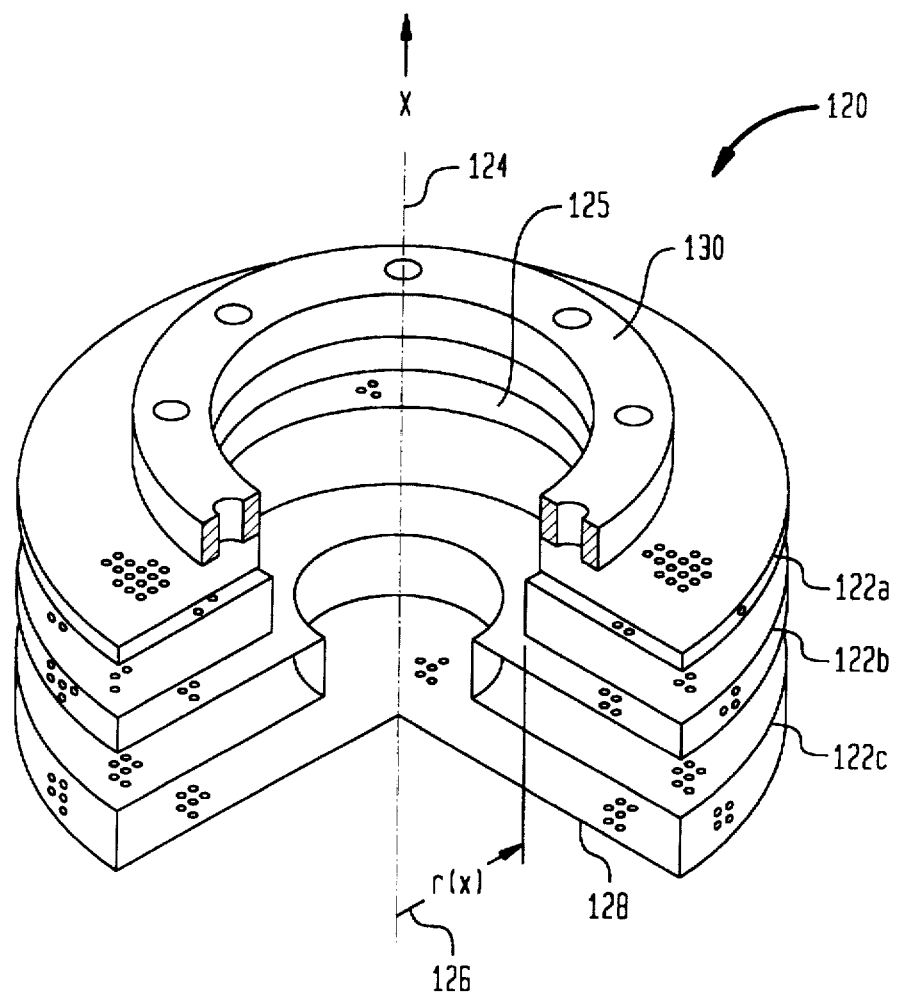
FIG. 3B illustrates a low aspect ratio embodiment of the preferred strainer illustrated in FIG. 3A.
Figure 3C:
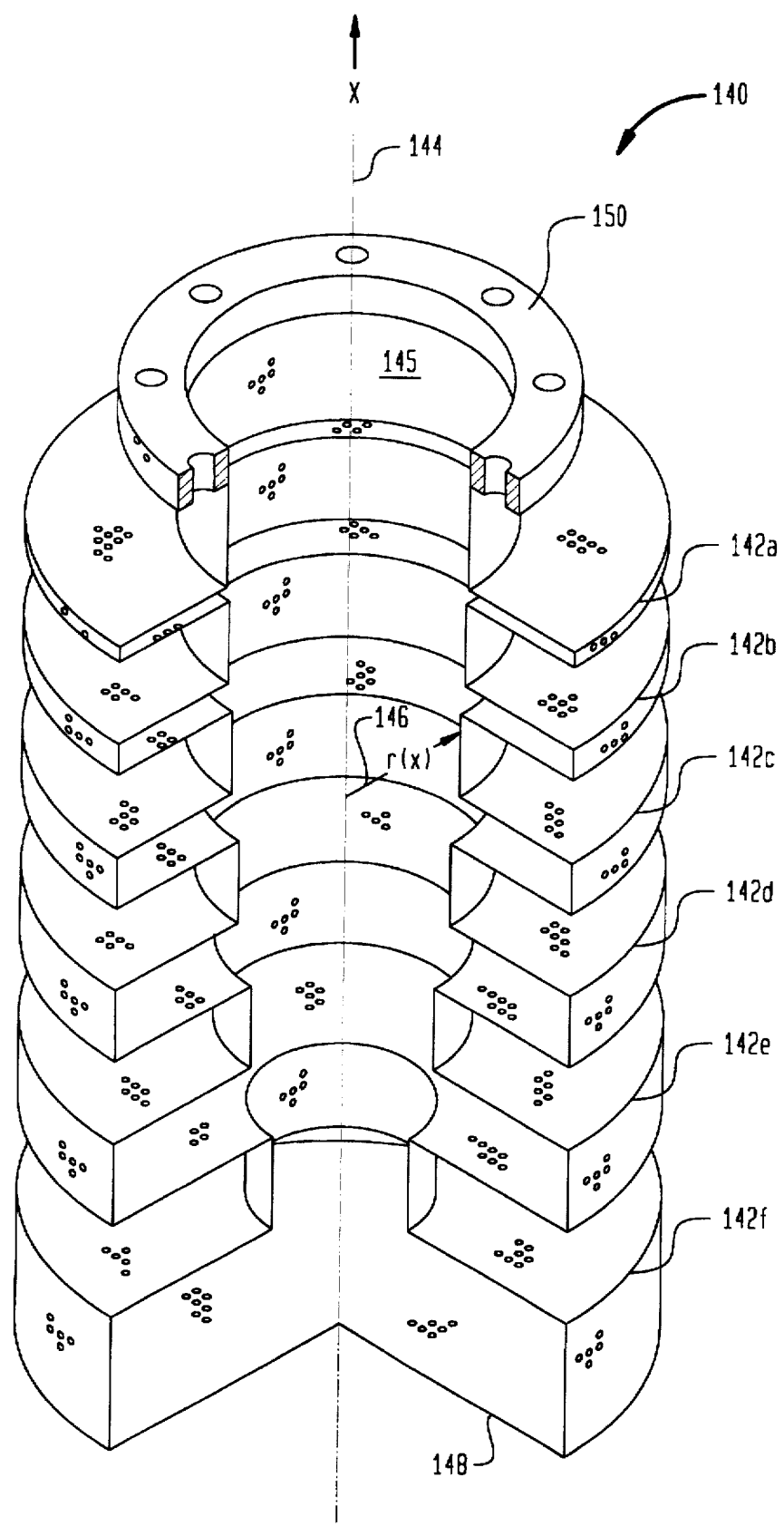
FIG. 3C illustrates a high aspect ratio embodiment of the preferred strainer illustrated in FIG. 3A.

The preferred embodiment 100 of the invention can be built with a low aspect ratio as shown by embodiment 120 of FIG. 3B or a high aspect ratio as indicated by embodiment 140 illustrated in FIG. 3C. Low aspect ratio embodiment 120 includes three disks 122a–122c. The low aspect ratio embodiment 120 also includes a varying internal radius r(x) 126 as measured about center line 124. The internal central core 125 is widest near the suction intake flange 130 and terminates at a distal plate 128. The low aspect ratio embodiment 120 includes fewer strainer disks 122a–122c, but an individual disk may have a relatively large external diameter.

In contrast the high aspect ratio embodiment 140 includes a larger number of strainer disks 142a–142f, but each individual disk might have a smaller external diameter than the strainer disks 122a–122c of the low aspect embodiment 120 illustrated in FIG. 3B. The low aspect embodiment 120 is, therefore, relatively low and squat as compared to the high aspect ratio embodiment 140 which is relatively long and thin. It therefore follows that the central core 145 of the high aspect embodiment 140 has an internal radius r(x) 146 that varies more gradually about x axis 144 from the intake suction flange 150 towards the distal end plate 148.

Except for strainer flange 110, the preferred embodiment 100 of the invention is preferably formed from perforated stainless steel plate with ⅛" round holes on ³⁄₁₆th" staggered centers. The perforated plate material is employed on the forward facing surfaces 112a–112f, on the rearward facing surfaces 116a–116f and on the outward circumferential surfaces 114a–114f.

Figure 4B:
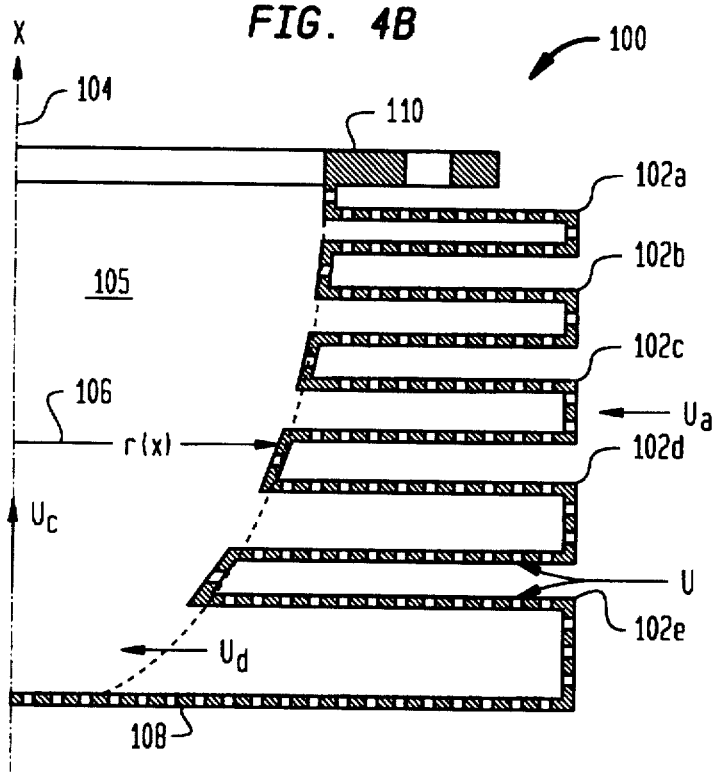
FIG. 4B illustrates the fluid velocities U, $U_a$, $U_c$ and $U_d$ associated with the cross-sectional view shown in FIG. 4A.

The nomenclature and parameters used to describe the geometry of the suction strainers and the related flow fields are illustrated in FIGS. 4A and 4B. The parameters illustrated in FIG. 4A are identified as follows:

R=the outer radius
r(0)=the strainer base radius
r(L)=the suction flange radius
t(L)=the minimum disk thickness
L=the length of the strainer
l=the constant disk spacing An important feature for the strainers fabricated according to the preferred embodiment 100 of the invention is to minimize head loss and to collect debris where velocities U are low, since the pressure drop across the debris bed is known to scale with the velocity or the velocity squared through the bed. Hence, the velocities have the following characteristics:

$$U_c > U_d > U$$

The highest velocities are found in the central region 105 of the core and are identified as velocity $U_c$. Velocities across the strainer surfaces 112a–112e, 114a–114e, 116a–116d and 118a–118d which determine the debris growth rate are designated as U. The velocity of the fluid leaving the stacked disks 102a–102e and entering the central core 105 of the strainer is denoted by $U_d$. A major purpose of the present invention is to minimize the acceleration of the fluid internal to the strainer 100 in regions where velocities are large. Accordingly, the families of internal geometries described by the function r(x) are limited to keep the velocities $U_c$ constant or nearly constant. A consequence of this novel approach is that the pressure drop along the central axis 104 is zero or nearly zero. Also, by controlling the thickness t(x) of the disks 102a–102e, it is possible to control the velocity of the fluid leaving the disk $U_d$ such that the mixing and acceleration loss as the fluid moves into the central core 105 of the strainer 100 is nominal. The ratio of $U_d/U_c$ can be independently controlled for each disk.

The radius of the central core region r(x) 106 varies linearly, or exponentially, or both, in the x direction 104 such that the radius r(x) 106 is a minimum at its greatest distance from the suction source and suction flange 110. This relationship helps to maintain a constant core velocity $U_c$ in the x direction 104, a specified velocity entering the core 105 from each disk $U_d$, and a constant velocity entering each disk U. A consequence of this novel structure is that while the velocity in the core region $U_c$ remains constant, the volumetric, or mass, flow rate increases as x increases toward the suction flange 110. The preferred embodiment 100 is illustrated in FIG. 3A, but it will be understood that the invention is not necessarily limited to the external shape or proportions illustrations in FIG. 3A. It could have, for example, a higher or lower aspect ratio as illustrated in FIGS. 3B and 3C. The thickness t(x) of each disk 102a–102f varies correspondingly with the internal radius r(x) 106 such that the ratio of the disk surface area to the internal transverse disk area (i.e., $2\pi r(x) t(x)$) at the interface to the core region 105 remains constant and equal for all disks. The head loss associated with the fluid leaving each disk 102a–102f, respectively, and entering the core flow is essentially independent of the location of each individual strainer disk. The fluid entering the core 105 for each disk 102a–102f turns through approximately the same angle. Keeping the same turning geometry for each disk 102a–102f minimizes the mixing and turning losses associated with the strainer 100 as a whole. This characteristic, combined with the constant core velocity $U_c$, minimizes the strainer head loss without debris and helps establish the desired distribution of debris loading in order to minimize head loss at all debris loadings.

The velocity U through the disk surfaces is nearly constant. The strainer 100, however, develops a nonuniform approach velocity $U_a$ because the area of the disks 102a–102f changes as a function of x. The approach velocity $U_a$ is shown in FIG. 4B. This nonuniform approach velocity $U_a$ allows the invention to optimally distribute fiber in order to develop minimum head loss. The invention utilizes the volume between disks 102a–102f to accumulate debris at the same rate without developing excessive head loss. For example, if the spacing between disks 102a and 102b is 20% full, then the spacing between the other disks is likewise 20% full.

An alternative embodiment of the invention 160 is illustrated in FIG. 5. In embodiment 160 the disk thickness t(x) is constant and independent of x 160 such that the thickness of disks 162a–162e is equal and t(a)=t(b)=t(c)=t(d)=t(e). In this embodiment 160, the velocity $U_d$ varies with x while still maintaining a constant core velocity $U_c$ around center line 164. The radius r(x) 166 between center line 164 and inner surfaces 170a–170d varies exponentially with x. Similarly, the internal radius r(x) 166 decreases the further the radius r(x) is from the pump intake suction flange and the closer it comes to the end plate 168. The foregoing produces a nonuniform approach velocity $U_a(x)$ 172 that increases with distance from the intake suction flange. While the external radius of embodiment 160 is shown as being constant, it will be understood that the external shape or proportions are not necessarily identical to those illustrated in FIG. 5. Embodiment 160 may be more appropriate for applications where the internal head loss is not critical.

Another alternative embodiment 180 is illustrated in FIG. 6. According to this embodiment, the internal radius r(x) 186 between center line 184 and internal surfaces 190a–190d of disks 182a–182e varies linearly as distance increases from the pump suction intake flange and as it approaches the end plate 188. Likewise, the thickness of each of the disks 182a–182e is constant so that t(a)=t(b)=t(c)=t(d)=t(e). Embodiment 180 approaches, but does not achieve, minimum internal head loss because of the approximation made to the internal radial profile. Note the nonuniform approach velocity $U_a(x)$ 192 that decreases with distance from the pump intake suction flange as the internal radius r(x) 186 approaches end plate 188. Embodiment 180 may be simpler to manufacture and still preserve the desired nonuniform approach velocity $U_a$. The external radius need not be constant and the invention 180 is not limited to the external shape or proportions illustrated in FIG. 6.

The embodiments described above can also be expressed by mathematical relations. Several of these relationships are illustrated below for different cases.

According to the preferred embodiment of the invention 100, the relationship between the inner radius of the disks r(x) and the distance along the strainer axis 104 is determined as follows:

$$\frac{r(x) - r(0) - \frac{1}{2} \frac{R^2 - r^2(L)}{r(L)t(L)} \ln\left(\frac{R^2 - r^2(x)}{R^2 - r^2(0)}\right)}{r(L) - r(0) - \frac{1}{2} \frac{R^2 - r^2(L)}{r(L)t(L)} \ln\left(\frac{R^2 - r^2(L)}{R^2 - r^2(0)}\right)} = \frac{x}{L}$$

where

R=the outer radius r(0)=the strainer base radius r(L)=the suction flange radius t(L)=the minimum disk thickness L=the length of the strainer l=the constant disk spacing and the thickness t(x) of the disks 102a–102f is determined by:

$$\frac{t(x)}{t(L)} = \left(\frac{R^2 - r^2(x)}{R^2 - r^2(L)}\right) \frac{r(L)}{r(x)}$$

For economy of fabrication, however, it might be desirable to fix the disk thickness t(x) at a constant t(c) and yet maintain a constant strainer core velocity $U_c$. Under those conditions the internal radius of the disks r(x) is given by:

$$\frac{R^2 - r^2(x)}{R^2 - r^2(0)} = \left(\frac{R^2 - r^2(L)}{R^2 - r^2(0)}\right)^{x/L}$$

The number of disks N in such an embodiment is given by:

$$N = L/(l+t)$$

and while the velocity through the strainer surface, U, is constant and not a function of x, the velocity of the flow leaving the disks, $U_d$, is a function of the distance along the strainer and varies according to the following relationship:

$$\frac{U_d(x)}{U} = \frac{R^2 - r^2(x)}{\pi r(x)}$$

An alternative embodiment, which still maintains a core velocity, $U_c$, and a constant disk velocity, $U_d$, but permits the velocity through the strainer surface, U, to vary along the strainer axis is obtained by specifying the disk inner radius r(x) according to the following relationship:

$$\frac{r(x) - r(0)}{r(L) - r(0)} = \frac{x}{L}$$

The disk thickness, t(x), is constant and the number of disks, N, is determined according to the following relationship:

$$N = L/(l+t)$$

Here the velocity through the strainer surface varies according to the distance along the strainer axis according to the following relationship:

$$\frac{U}{U_c} = \frac{r(L) - r(0)}{N} \cdot \frac{r(x)}{R^2 - r^2(x)}$$

Figure 7:
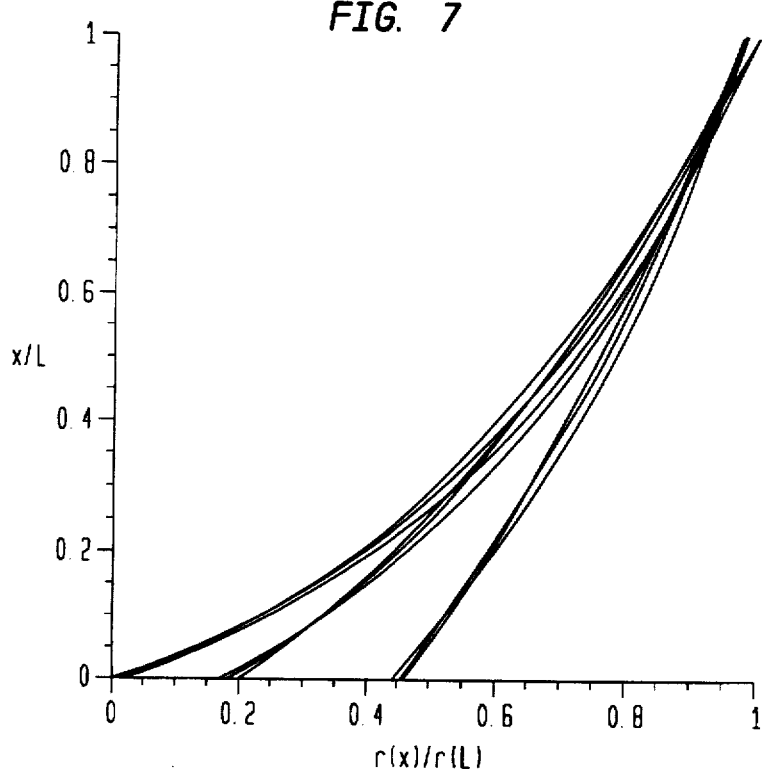
FIG. 7 is a graph of normalized internal radii r(x) as a function of the normalized distance x for the preferred embodiment illustrated in FIG. 3A showing curves for several different choices of base and outer radii.
Figure 8:
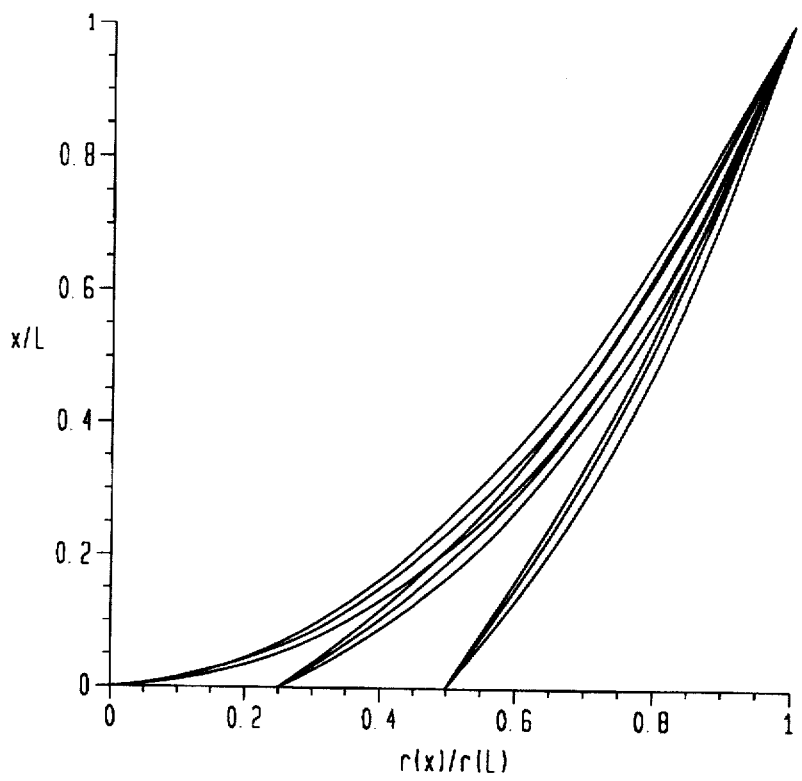
FIG. 8 is a graph of normalized internal radii r(x) as a function of the normalized distance x for an exponentially varying internal radius r(x) such as seen in FIG. 5, and wherein several curves are shown based upon different base and outer radii.
Figure 9:
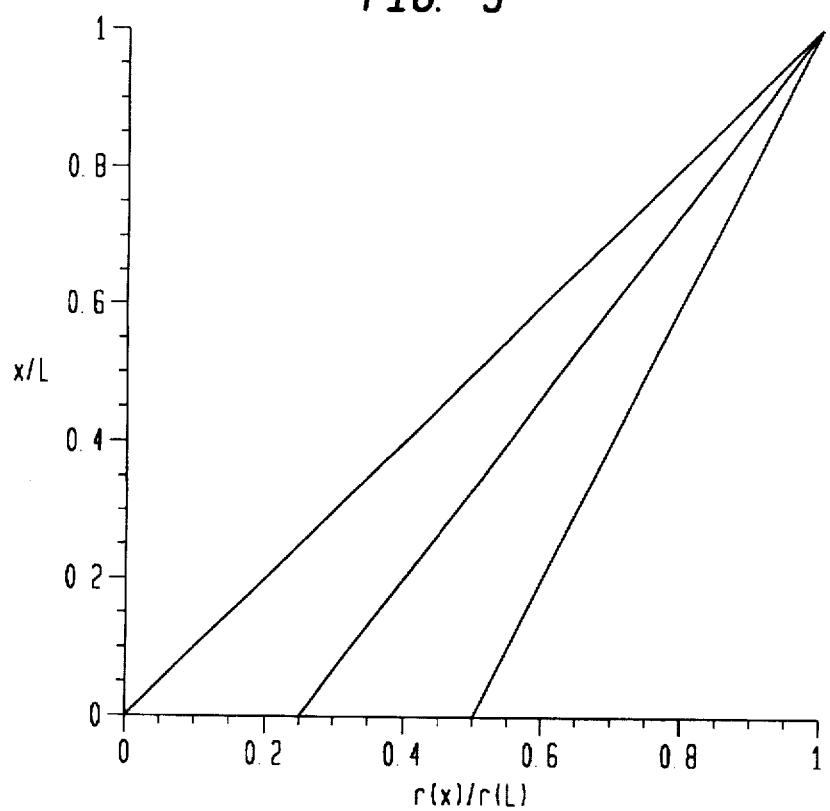
FIG. 9 is a graph of normalized internal radii r(x) as a function of the normalized distance x from the suction intake for a linearly varying internal radius r(x) embodiment such as illustrated in FIG. 6, and wherein different curves illustrate different choices of base and outer radii.

FIG. 7 is a graph which illustrates the principles described for a family of inner disk radii r(x) for the preferred embodiment 100 illustrated in FIG. 3A. If the disk thickness t(x) is held constant such that the velocity, $U_d$, leaving the disks is not constant, the result is a family of inner disk radii r(x) illustrated in the table of FIG. 8. If the velocity through the strainer surface is permitted to vary with distance along the strainer, this results in a linear variation of the strainer inner radius r(x) as illustrated in the table of FIG. 9. FIGS. 7–9 illustrate a portion of the range of shapes the invention can take for different design inputs.

Figure 10A:
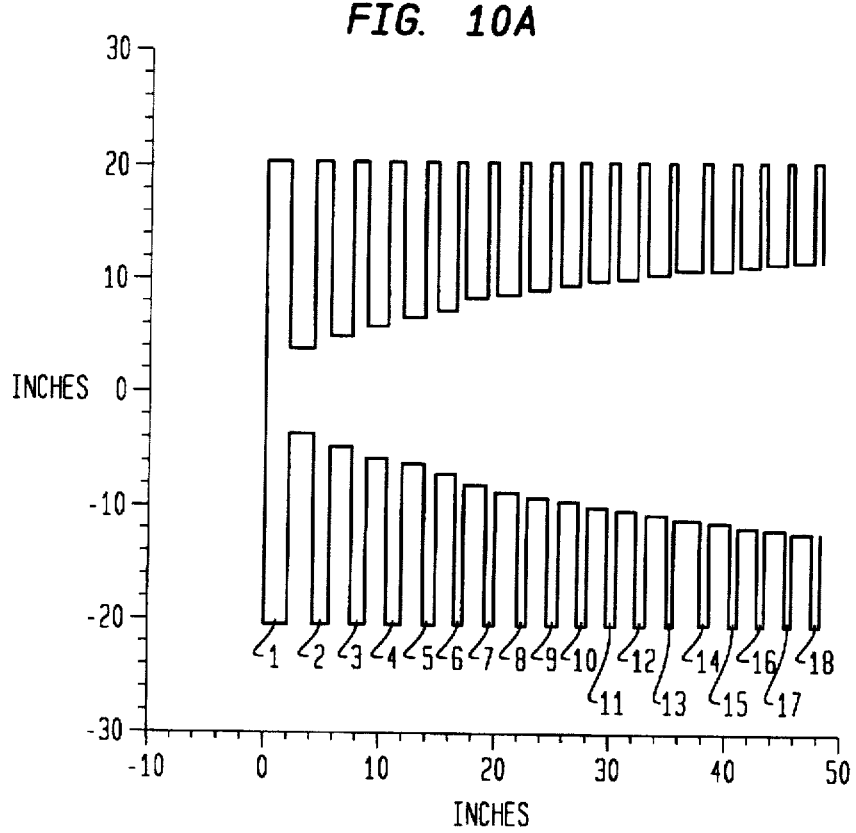
FIG. 10A is a scale drawing of the preferred embodiment illustrated in FIG. 3A for a particular application.

Using the design principles described above, a strainer was designed with the following geometrical constraints:

R the outer radius=1.66 feet r(0) the strainer base radius=3 inches r(L) the suction flange radius=1 foot t(L) the minimum disk thickness=0.375 inches L the length of the strainer=4.0 feet l the constant disk spacing=2.0 inches The strainer had a surface area of 273 square feet and included 18 disks with a profile such as shown in FIG. 10A. The fabrication dimensions are given in the table of FIG. 10B.

Figures 10B, 11:
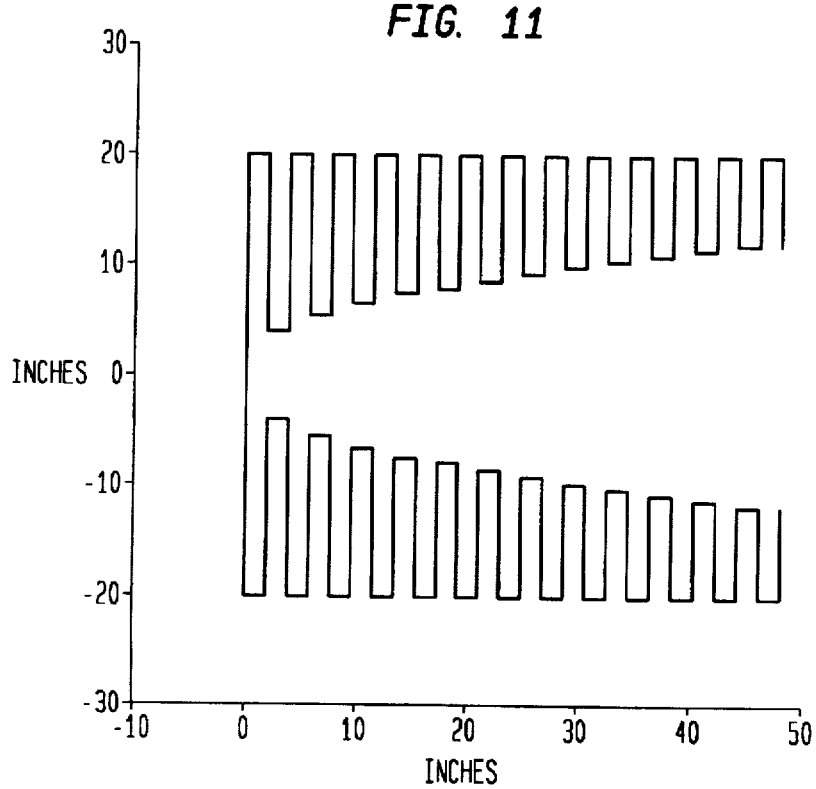
FIG. 10B is a table giving the dimensions for the particular embodiment illustrated in FIG. 10A.
FIG. 11 is a scale cross-sectional illustration of an embodiment where the internal radius r(x) varies exponentially as shown, for example, in the embodiment of FIG. 5 and as sized for a particular application.

If all design parameters remain the same as above, except that the disk thickness t(x) is held constant at t=1.8 inches and the velocity through the strainer surface U is held constant, the design cross section changes to that illustrated in profile in FIG. 11. This design has a strainer surface area of 210 square feet.

Figure 12:
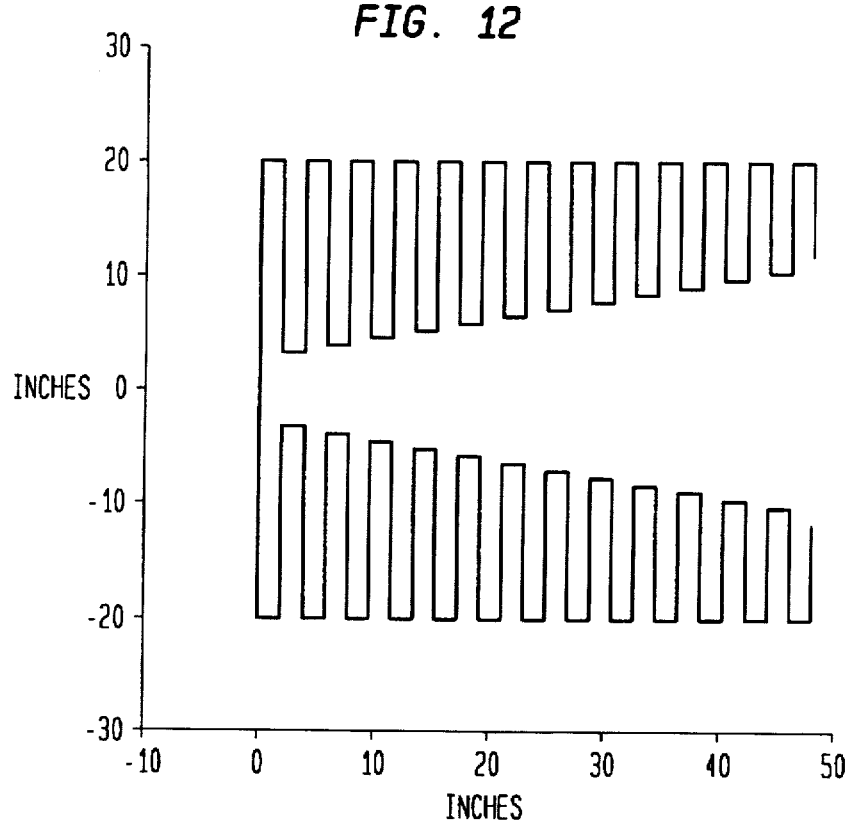
FIG. 12 is a scale cross-sectional illustration of an embodiment where the internal radius r(x) varies linearly such as shown in the embodiment of FIG. 6, and wherein the strainer is sized for a specific application.

In addition, if all the design parameters remain the same as above, except that the disk thickness t(x) is held constant at t=1.8 inches and the velocity of the fluid leaving the disks, $U_d$, is held constant, the design cross section changes to that illustrated in FIG. 12. According to this embodiment, the strainer surface varies with x and the strainer area was determined to be 207 square feet.

Figure 13:
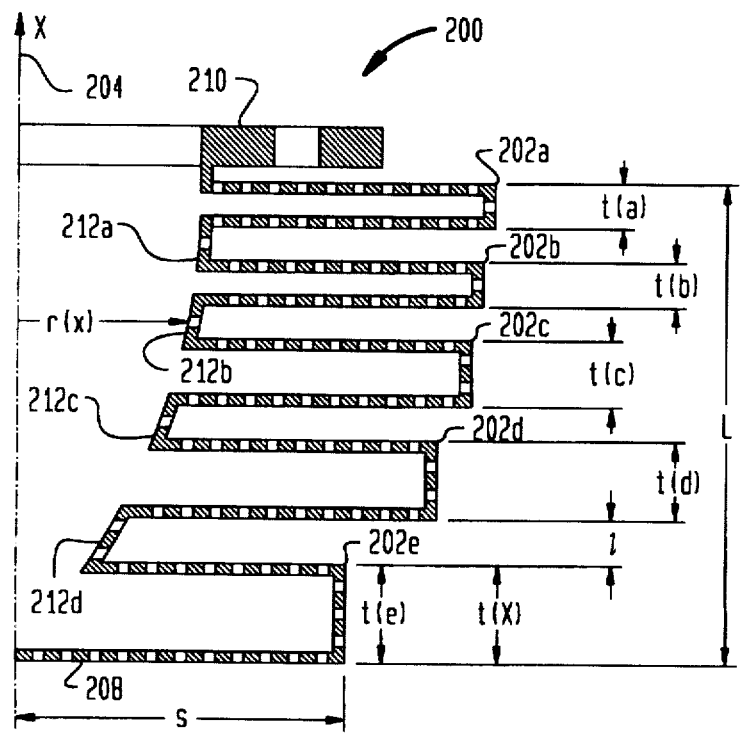
FIG. 13 is a partial, cross-sectional illustration of an alternative embodiment of the invention in which the outer radius of the disks decrease with distance from the suction intake in order to minimize the hydro-dynamic moment on the suction flange.

For dynamic load considerations on a strainer, it may be desirable to locate the strainer area nearest the suction flange 210 as illustrated in embodiment 200 of FIG. 13. According to this embodiment, the strainer inner radius r(x) between the inner surfaces 212a–212d of the disks 202a–202e is given by the following relationship:

$$\frac{r(x)\left(\frac{1}{s} + \frac{2r(L)r(L)}{2r(L)s + s^2}\right) - \frac{1}{2}\ln\left(\frac{2r(x)}{s} + 1\right)}{r(L)\left(\frac{1}{s} + \frac{2r(L)r(L)}{2r(L)s + s^2}\right) - \frac{1}{2}\ln\left(\frac{2r(L)}{s} + 1\right)} = \frac{x}{L}$$

where the outer radius of the strainer 200 is now given by:

$$R(x) = r(x) + s$$

and s is the width of the disks 102a–102e as shown in FIG. 13. This disk thickness varies according to the following relationship:

$$\frac{t(x)}{t(L)} = \frac{2 + s/r(x)}{2 + s/r(L)}$$

In embodiment 200 the velocities $U_c$, $U_d$, and U are substantially constant as the internal radius r(x) between center line 204 and the inner surfaces 212a–212d vary and decrease with distance from suction flange 210 as the radius r(x) approaches end plate 208. Note that the disk thicknesses t(x) are not constant and that the outer radius of the embodiment 200 decreases with distance from the suction flange 210.

Figure 14:
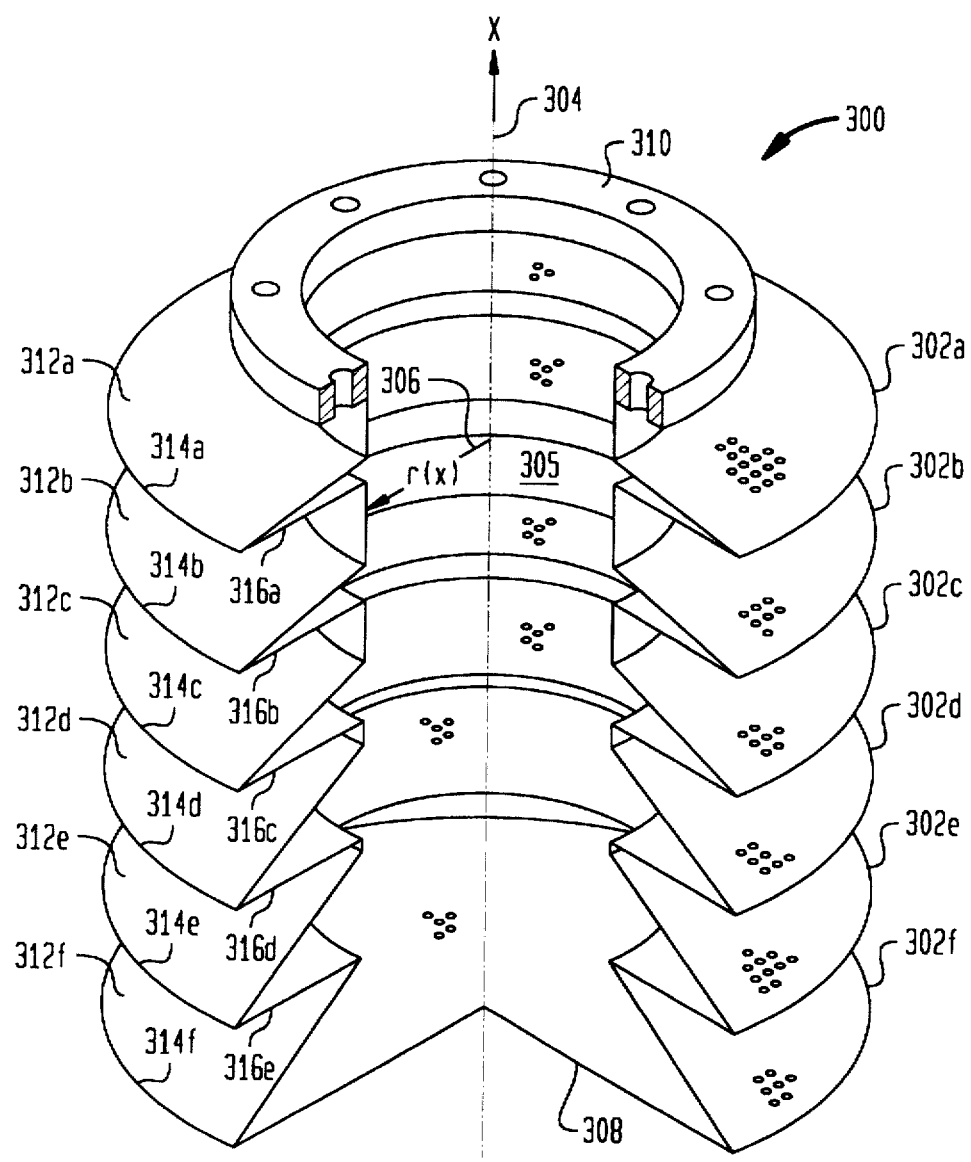
FIG. 14 illustrates an alternative embodiment of the invention in which the multiple stacked disks are tapered instead of being of uniform thickness.
Figure 15A:
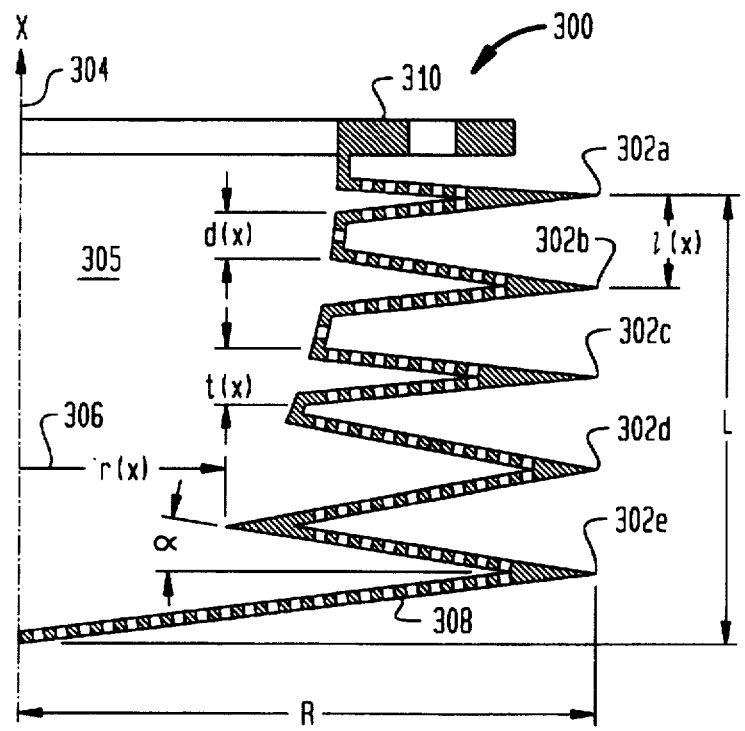
FIG. 15A illustrates the nomenclature used to describe parameters with respect to the tapered disk embodiment of FIG. 14.
Figure 15B:
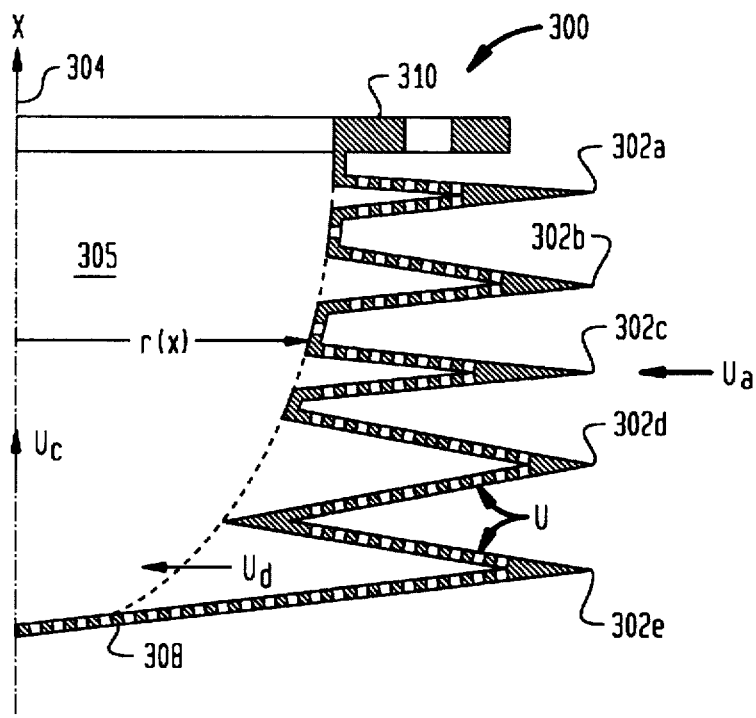
FIG. 15B illustrates the fluid velocities U, $U_a$, $U_c$, and $U_d$ associated with the tapered disk strainer illustrated in FIGS. 14 and 15A.

Another family of embodiments calls for the elimination of the circumferential, perpendicular surface 114a–114f of preferred embodiment 100 which results in a tapered disk embodiment 300 as illustrated in FIG. 14. Tapered disk embodiment 300 includes a plurality of tapered disks 302a 302f around a center line 304. The strainer 300 includes a strainer suction flange 310 opposite from a distal end plate 308. Each of the tapered disks 302a–302f includes a forward facing first surface 312a–312f and a rearward facing second surface 316a–316e connected together at an edge 314a–314f, respectively. The nomenclature to describe the geometry and fluid flow of strainer 300 are illustrated in FIGS. 15A and 15B.

The internal radius r(x) 306 and plate thickness may vary in a prescribed way in order to maximize the amount of debris that can be accumulated while minimizing strainer head loss within a given overall size or volume envelope. An important feature of the tapered strainers, which are intended to minimize head loss, is to collect debris where velocities are low, since the pressure drop across the debris bed is known to scale with a velocity or velocity squared through the bed. Hence, the strainer velocities are such that $U_c > U_d > U$. The highest velocities are in the central region of the strainer and are denoted by $U_c$. The velocities across the strainer surface and, hence, through the debris bed, which will accumulate on those surfaces, is designated as U. The velocity of the fluid leaving the stacked disks and entering the central region 305 of the strainer 300 is denoted by $U_d$. A major purpose of the tapered embodiment 300 is to minimize the acceleration of the fluid internal to the strainer 300 in regions where velocities are large. Therefore, the velocities of the internal geometries described by the function r(x) are selected to keep the velocities $U_c$ constant or nearly constant. A consequence of this feature is that the pressure drop across the axis 304 of the strainer 300 is zero or nearly zero. Moreover, by controlling the thickness t(x) of the disks it is possible to control the velocity of the fluid leaving the disk $U_d$ such that the mixing and acceleration loss as the fluid moves into the central core 305 of the strainer 300 is nominal.

The radius r(x) of the core region 305 varies linearly, exponentially, or linearly and exponentially, with x such that the radius r(x) decreases the further it is removed from the suction flange 310. This helps assure that there is a constant core velocity $U_c$ in the x direction, a constant velocity entering the core 305 from each disk $U_d$, and a constant velocity entering each disk U. A consequence of this unique structure 300 is that while the velocity in the core region 305 remains constant, the volumetric (or mass) flow rate increases as x increases towards the suction flange 310 and away from the distal end plate 308. The preferred embodiment 300 of the tapered plate version of the invention is shown in FIG. 14 but is not necessarily limited to the external shape or proportions illustrated. The disks 302a–302f are shown tapered to a point 314a–314f, respectively, but for structural and flow reasons, a small minimum of thickness may also be employed.

The thickness t(x) of each disk 302a–302f varies correspondingly with the internal radius r(x) 306 such that the ratio of the disk surface area to the internal transverse disk area (2 π r(x) t(x)) at the interface to the core region 305 remains constant and equal for all disks. The head loss associated with the fluid leaving each disk 302a–302f and entering the core flow $U_c$ is essentially independent of its location in the strainer 300. The fluid entering the core from each disk 302a–302f turns through approximately the same angle. Maintaining geometrically similar turning angles minimizes the mixing and turning losses in the strainer 300. This feature, combined with the constant velocity core, minimizes the strainer head loss without debris and helps establish the desired distribution of debris loading to provide minimum head loss at all debris loadings.

The velocity through the disk surfaces 312a–312f and 316a–316e is nearly constant. However, the strainer 300 develops a nonuniform approach velocity because the area of the disks 302a–302f changes as a function of x. The approach velocity $U_a$ is illustrated in FIG. 15B. This nonuniform approach velocity allows the invention 300 to optimally distribute fiber to develop minimum head loss. The invention 300 utilizes the volume between the disks to accumulate debris without developing excessive head loss. The internal radius r(x) variation depends upon the thickness t(x) of the disks compared to the spacing d(x) between the disks 302a–302f. When the disk thickness t(x) is less than the nominal spacing d(x), the square of the radius r(x) varies exponentially in the x direction. When the thickness t(x) is greater than or equal to the nominal spacing d(x), then the radius r(x) varies linearly with x. The thicker disks are found away from the suction flange 310 of the strainer 300.

Figure 16:
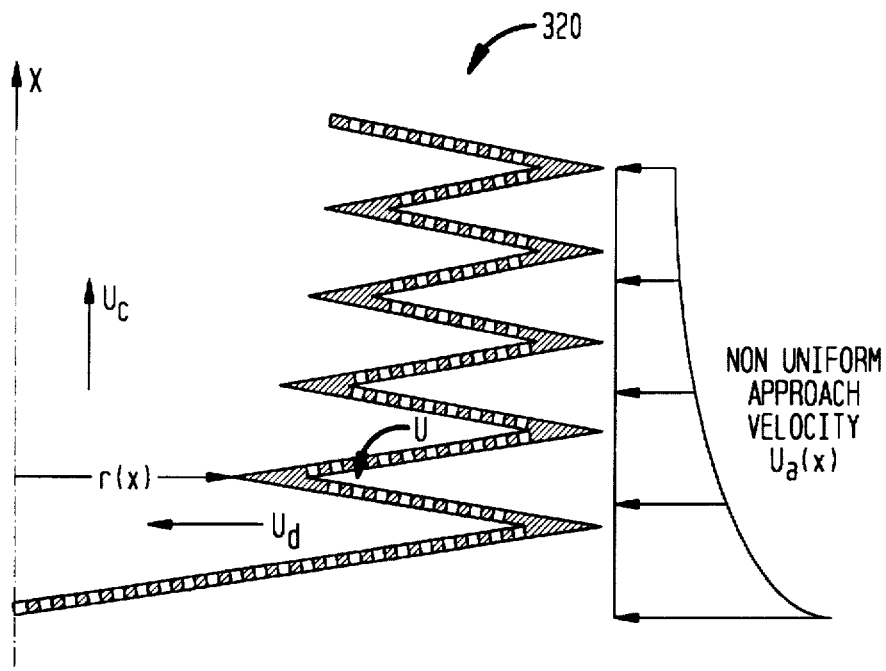
FIG. 16 is an elevated, partial cross-sectional view of the tapered disk embodiment in which the internal radius r(x) decreases exponentially with distance from the suction intake.

An alternative embodiment 320 of the invention allows the disk thickness t(x) to be constant at the inner radius r(x) and independent of x. In this case, the velocity U varies with x while still maintaining a constant core velocity $U_c$ and a constant velocity exiting the disks into the core $U_d$. Here, the radius r(x) varies exponentially with x. A cross sectional view of this embodiment is illustrated in FIG. 16. Similar to the varying disk thickness embodiment 300, the outer radius of embodiment 320 need not be constant and is not limited to the external shape or proportions illustrated in FIG. 16. Embodiment 320 may be appropriate for applications where the internal head loss is not as critical.

If the velocity $U_d$ is allowed to vary and U and $U_c$ are constant, then the square of the inner radius r(x) varies exponentially with x. Embodiments 300 and 320 have an internal radius r(x) that varies similarly to the proportions of the preferred embodiment corresponding to the region where the thickness is greater than the nominal spacing and the region where the thickness is less than the nominal spacing, respectively, so that there is a constant velocity $U_d$ exiting the disks into the core $U_c$.

Figure 17:
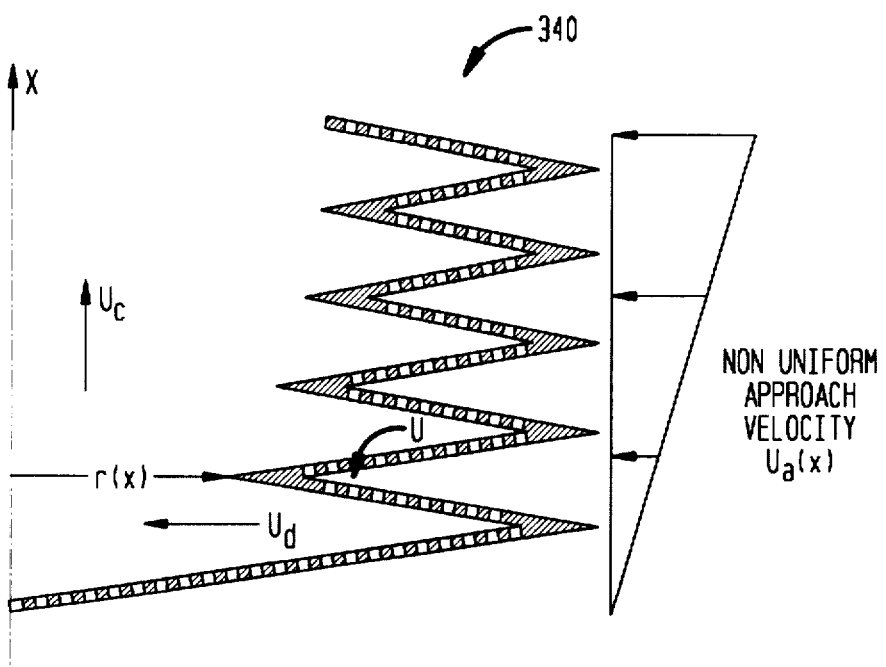
FIG. 17 is an elevated, partial cross-sectional view of the tapered disk embodiment in which the internal disk radius r(x) decreases linearly with distance from the suction intake.

Another embodiment 340 of the tapered disk invention is illustrated in FIG. 17. In embodiment 340, the inner radius r(x) varies linearly with x. Similar to the varying disk thickness embodiment 300, the outer radius need not be constant and the invention is not limited to the external shape or proportions illustrated in FIG. 17.

Figure 18:
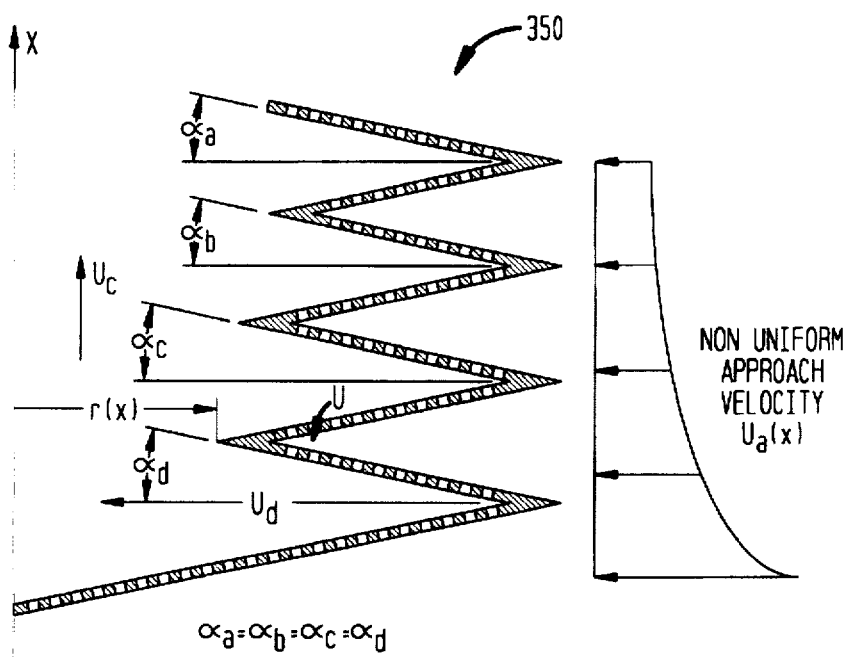
FIG. 18 is a partial cross-sectional view of the tapered disk embodiment in which the internal disk angle α is constant.

Another tapered disk embodiment 350 is illustrated in FIG. 18. In embodiment 350, the disk angle α remains constant so that $\alpha_a = \alpha_b = \alpha_c = \alpha_d$. For both cases where U and $U_d$ are allowed to vary, the radius r(x) varies linearly and exponentially with x. This embodiment approaches, but does not achieve, the theoretical minimum internal head loss because of the approximation made to the internal radial profile. However, embodiment 350 may be simpler to manufacture and still preserve the desired nonuniform approach velocity. Again, the outer radius of embodiment 350 need not be constant and the invention is not limited to the external shape or proportions illustrated in FIG. 18.

The preferred tapered disk embodiment 300 has the following parameters:

R=the outer radius r(x)=internal core radius r(0)=the strainer base radius r(L)=the suction flange radius t(L)=the minimum disk thickness at the inner radius L=the length of the strainer l(x)=the constant disk spacing as long as t(x)<l α=angle of strainer top and bottom surfaces with respect to plane perpendicular to center line x For these dimensions, the relationship between the inner radius r(x) of the disks and the distance along the axis of the strainer X can be computed from the following:

$$\frac{R^2 - r^2(x)}{R^2 - r^2(L)} = \exp\left(\frac{-2U}{lU_c}(x-L)\right) \quad t(x) < l$$

$$r(x) = \frac{U_d}{U} x + r(0) \quad t(x) \geq l$$

and the thickness t(x) of the disks is determined by:

$$\frac{t(x)}{t(L)} = \left(\frac{R^2 - r^2(x)}{R^2 - r^2(0)}\right) \frac{r(L)}{r(x)}$$

and l=t(x) when t(x) is greater than the initial value of l.

For economy of fabrication it may be desirable to set the disk thickness at a constant t(c) at the inner radius and a smaller constant thickness at the outer radius and yet maintain a constant core velocity $U_c$.

Under these conditions the internal radius of the disks r(x) is given by:

$$r(x) = \frac{U_d}{U_c} x + r(0)$$

when $U_d$ is constant and by:

$$\ln\left(\frac{R^2 - r^2(x)}{R^2 - r^2(0)}\right) = \frac{2U}{tU_c} x$$

when U is constant.

The number of disks, N, in this embodiment is given by $$N = L/l$$

An alternate embodiment which still maintains a constant core velocity, $U_c$, can be developed by maintaining a constant disk angle $\alpha$. For the case where $U_d$ is constant the internal radius varies as:

$$\frac{\frac{3}{R}(r(x)-r(0))-\ln\left(\frac{R-r(x)}{R-r(0)}\right)}{\frac{3}{R}(r(L)-r(0))-\ln\left(\frac{R-r(L)}{R-r(0)}\right)}=\frac{x}{L}$$

when U is constant the internal radius varies as:

$$\frac{\frac{3}{R}(r(x)-r(0))+0.5\ln\left(\frac{1-\frac{r^2(x)}{R^2}}{1-\frac{r^2(0)}{R^2}}\right)}{\frac{3}{R}(r(L)-r(0))+0.5\ln\left(\frac{1-\frac{r^2(L)}{R^2}}{1-\frac{r^2(0)}{R^2}}\right)}=\frac{x}{L}$$

The disk thickness, t(x), is computed from $$t(x)=2(R-r(x))\tan\alpha$$

where $\alpha$ is the disk angle shown in FIG. 15A.

Figure 19:
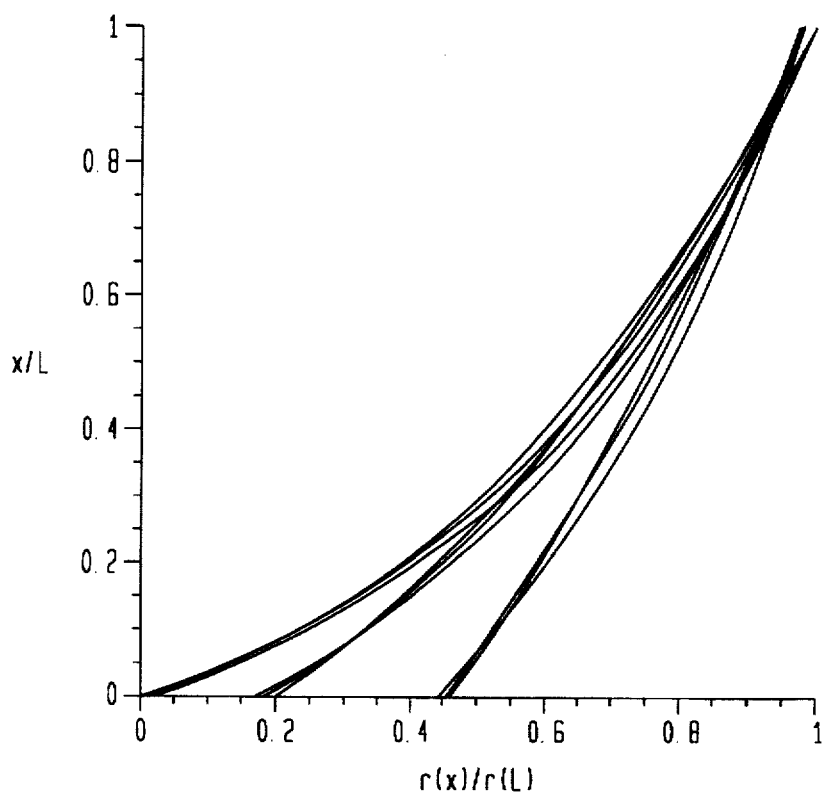
FIG. 19 is a graph illustrating normalized internal radii r(x) as a function of the normalized distance x for the tapered disk embodiment with t(x)<1 and also showing other curves for different base and outer radii.
Figure 20:
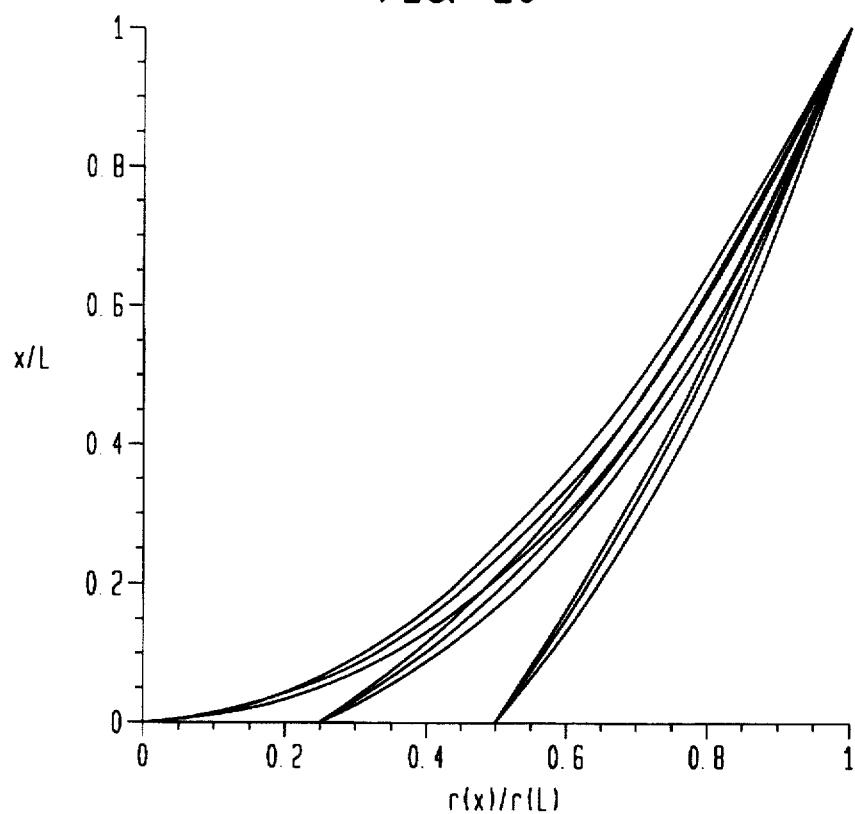
FIG. 20 is a graph illustrating normalized internal radii r(x) as a function of the normalized distance x for an exponentially varying internal radii for the tapered disk embodiment in which the disks have a constant thickness and wherein several curves are shown based upon different base and outer radii.
Figure 21:
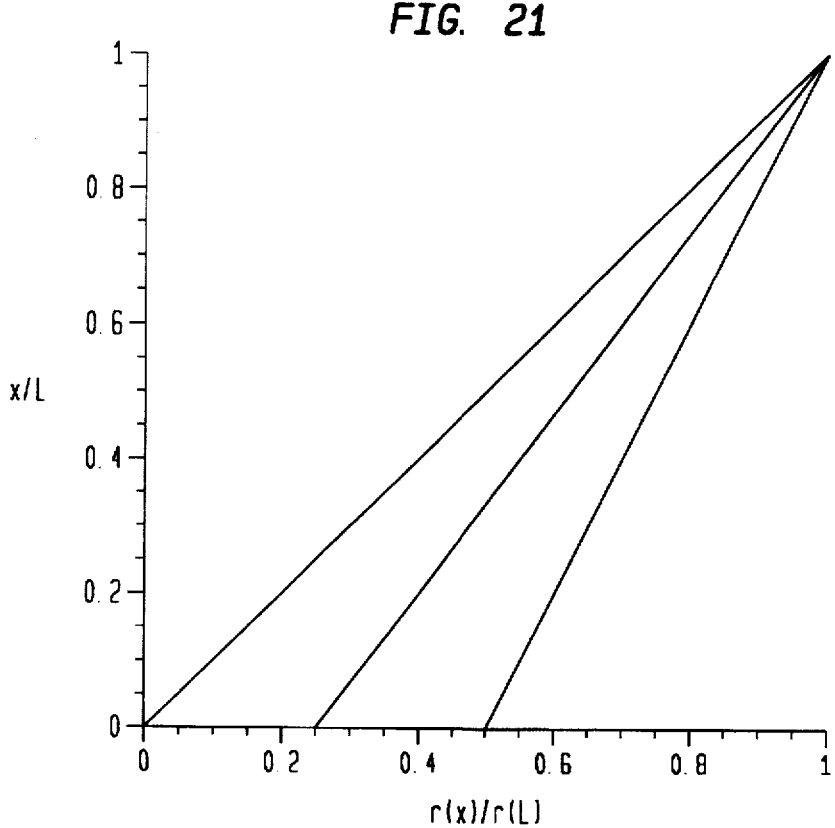
FIG. 21 is a graph of a normalized internal radii r(x) as a function of the normalized distance x from the suction intake as it decreases linearly with increased distance from the suction intake but keeping the disk thickness relatively constant and also showing other curves for different base and outer radii.
Figure 22:
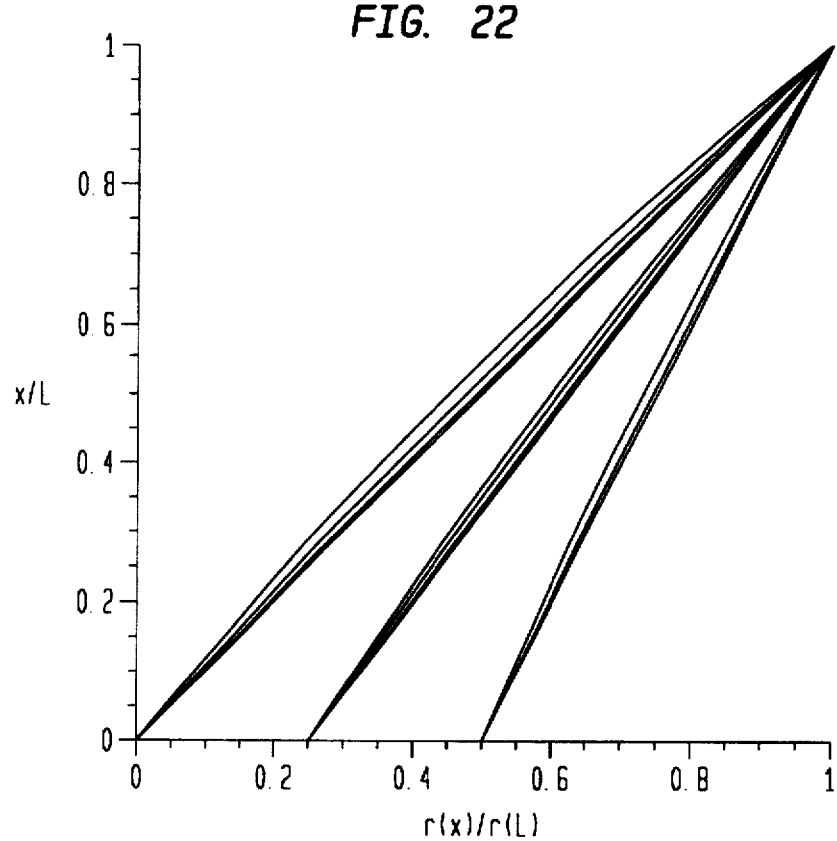
FIG. 22 is a graph of a normalized internal radii r(x) as a function of the normalized distance x from the suction intake for a constant disk angle α and constant $U_a$.
Figure 23:
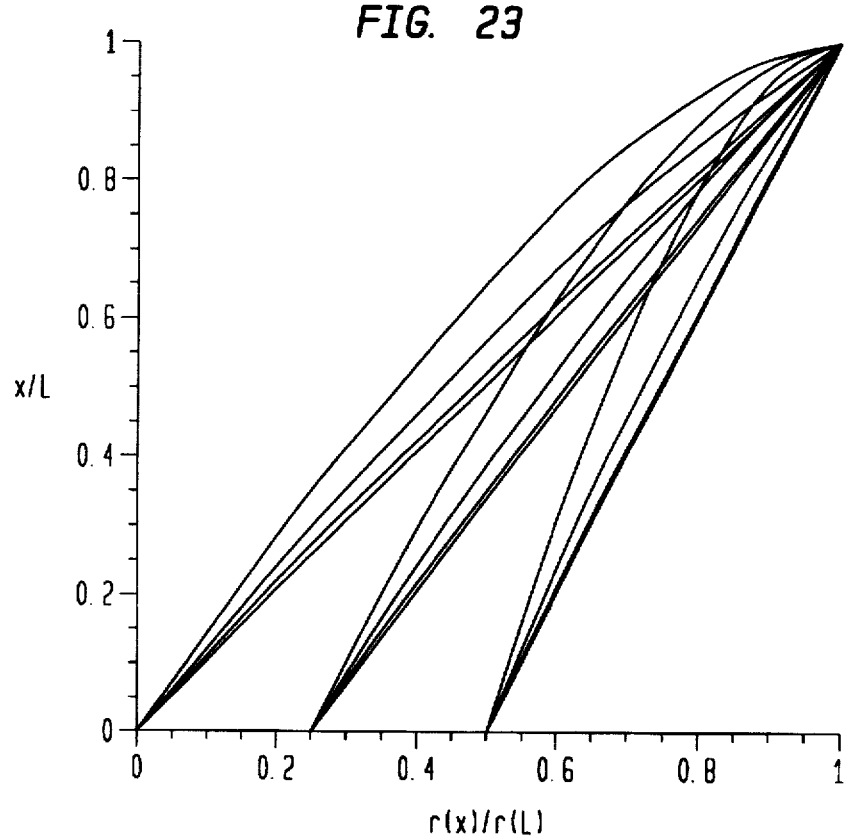
FIG. 23 is a graph of normalized internal radii r(x) as a function of the normalized distance x from the suction intake for a constant disk angle α and a constant U.

In order to illustrate the principles obtained by the invention, a family of inner disk radii r(x) for the tapered disk embodiment 300 is illustrated in FIG. 19 where t(x)<l. Holding the disk thickness constant, t(x)=t(c), such that the velocity $U_d$ leaving the disks is not constant, results in the family of inner disk radii r(x) shown in FIG. 20. Allowing the velocity through the strainer surface to vary with distance along the strainer results in a linear variation of the strainer inner radius as shown in FIG. 21. The family of curves shown in FIGS. 19 and 21 can be combined for some embodiments where the internal radial variation changes from exponential to linear. FIGS. 22 and 23 illustrate the internal radial variation with x for the case of constant angle $\alpha$ disks, with $U_d$ and U held constant, respectively. FIGS. 19–23 illustrate a portion of the ranges of shapes the invention can take for different design inputs.

Figure 24A:
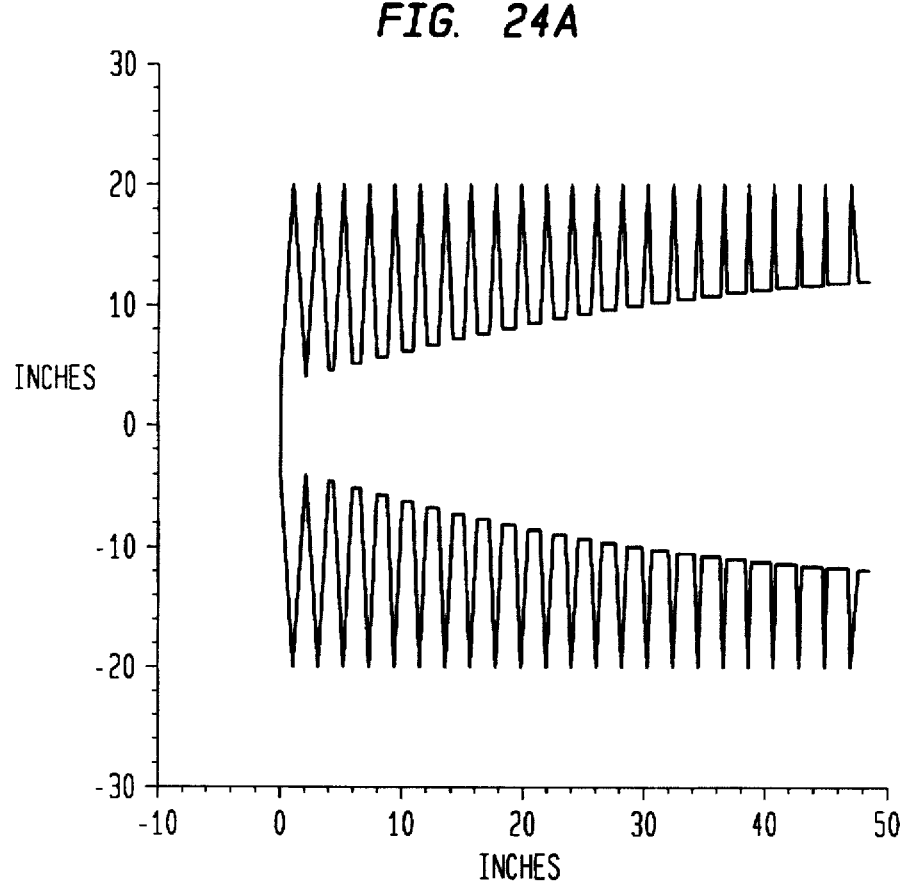
FIG. 24A is a scale drawing of the tapered disk embodiment such as illustrated in FIG. 14 as sized for a particular application.

A tapered disk embodiment 300 was constructed from the design principles set forth above with the following geometrical constraints:

R the outer radius=1.66 feet r(0) the strainer base radius=3 inches r(L) the suction flange radius=1 foot t(L) the minimum disk thickness=0.375 inches L the length of the strainer=4.0 feet l the constant disk spacing=2.0 inches The strainer of this example had a surface area of 336 sq. feet and 24 disks. The cross section of this example is illustrated in FIG. 24A and was constructed with the fabrication dimensions given in the table of FIG. 24B.

Figure 25:
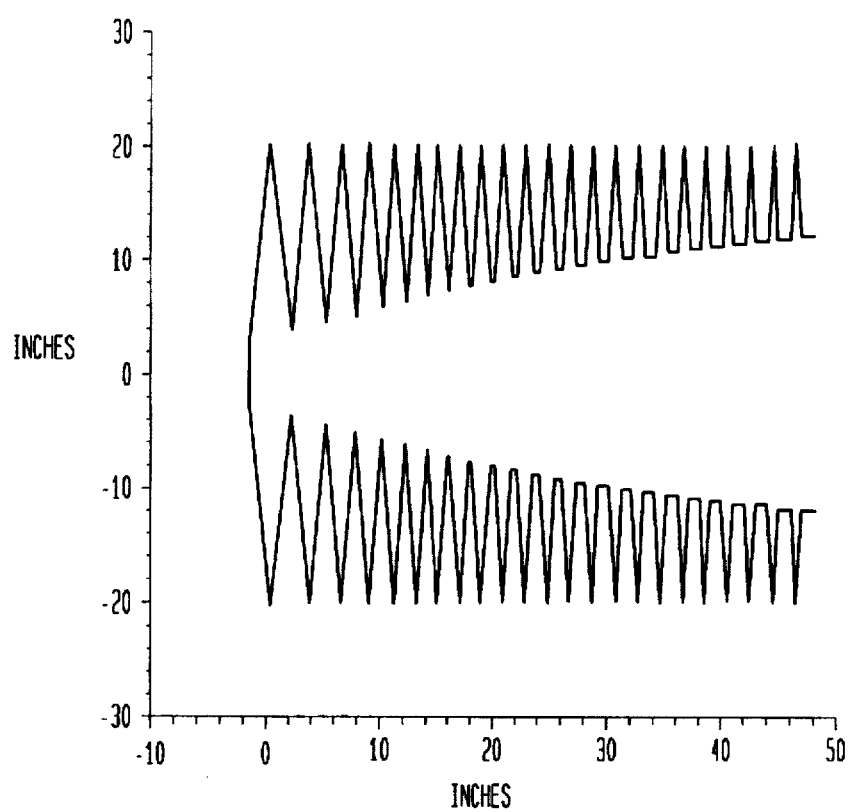
FIG. 25 is a scale drawing of the tapered embodiment, such as illustrated in FIG. 14, with the transition to a linear variation of internal radius r(x) occurring closer to the suction flange or intake.

FIG. 25 is a scale drawing of the tapered disk embodiment with a greater minimum thickness. This produces a larger portion of the strainer where r(x) varies linearly.

Figure 26:
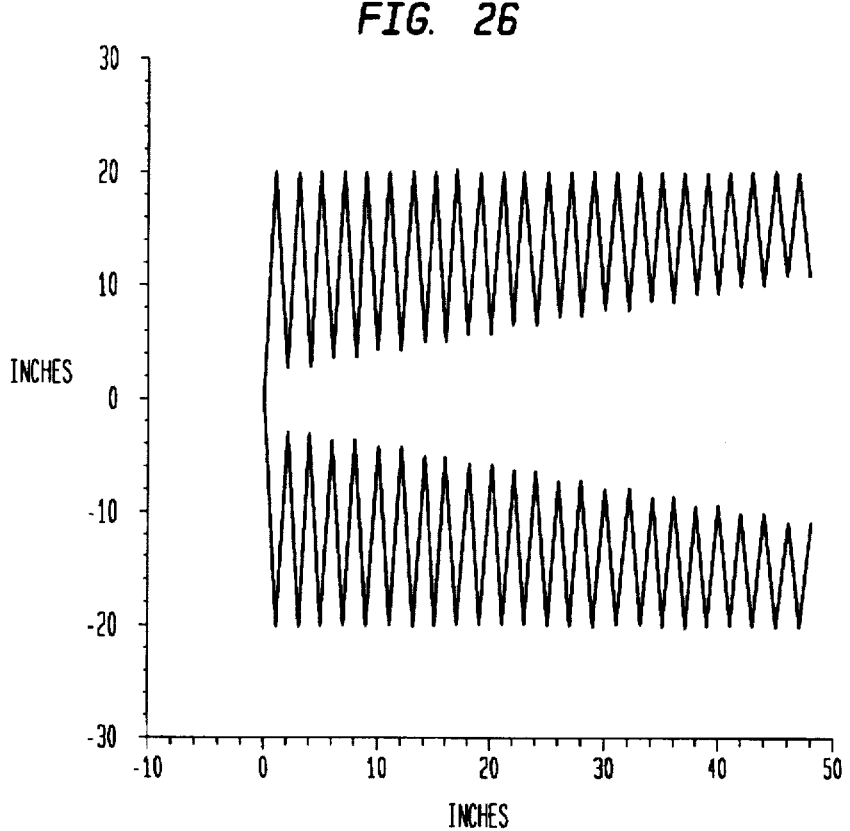
FIG. 26 illustrates a tapered disk embodiment in which the internal radius r(x) decreases linearly with distance from the suction intake and wherein the disk thickness remains substantially constant.
Figure 27:
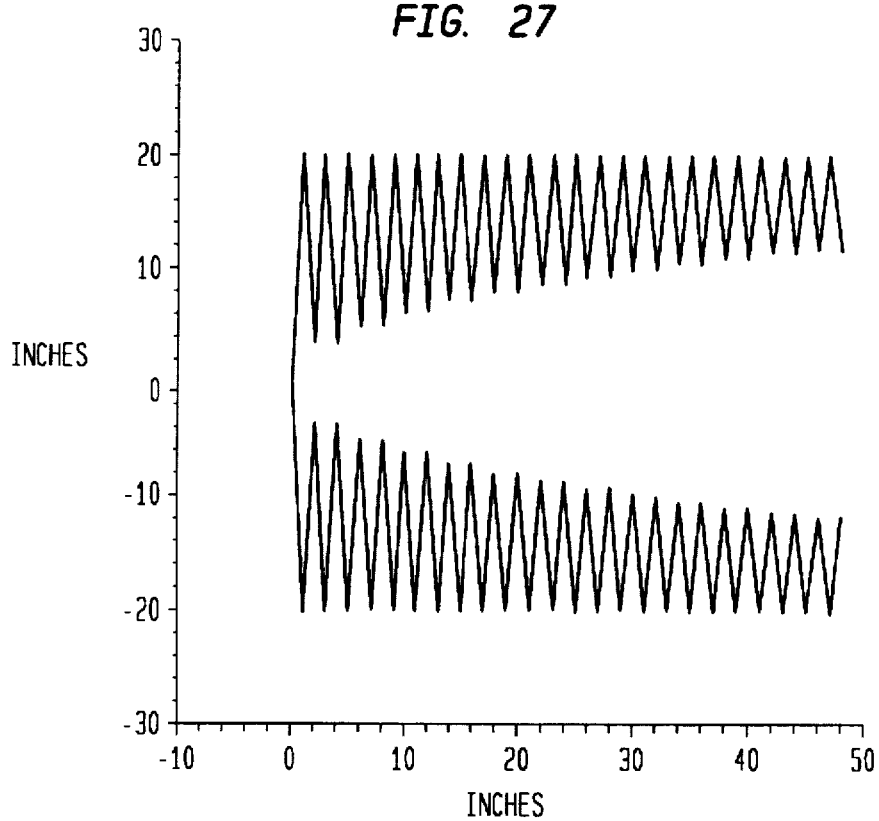
FIG. 27 illustrates the tapered disk embodiment in which the internal radius r(x) decreases exponentially with distance from the suction intake and wherein the disk thickness remains substantially constant.
Figure 28:
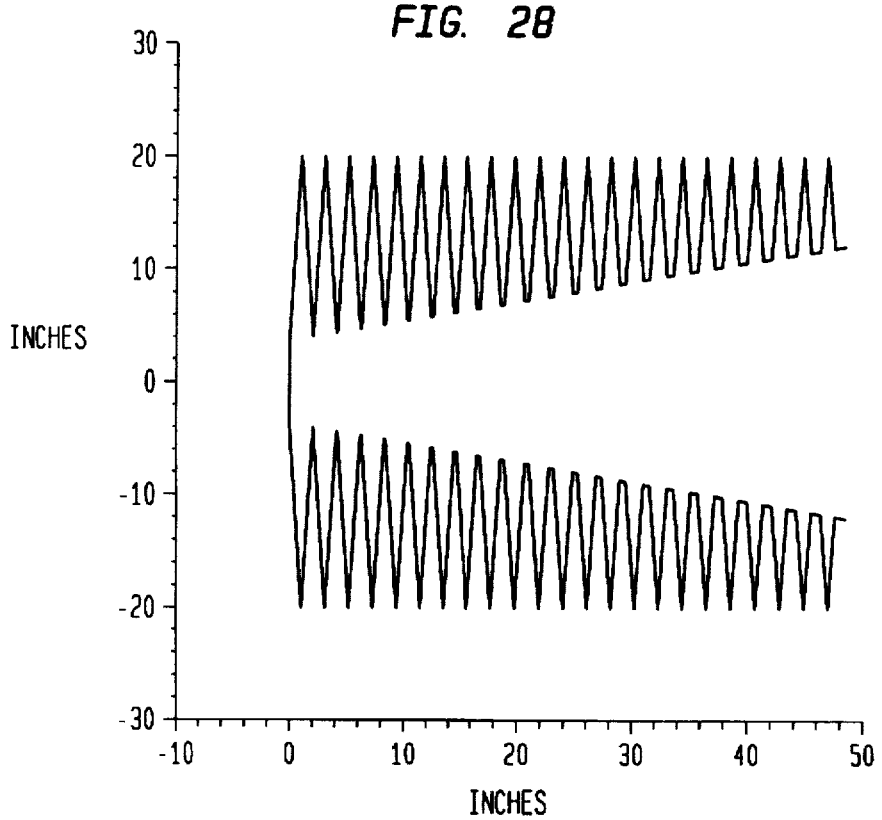
FIG. 28 illustrates the tapered disk embodiment in which the disk angle α and $U_d$ remain substantially constant.

FIG. 26 illustrates a scale drawing of a linearly varying r(x) whereas FIG. 27 illustrates a scale drawing of an exponentially varying r(x). A scale illustration of a constant disk angle $\alpha$ embodiment is illustrated in FIG. 28.

Figure 29:
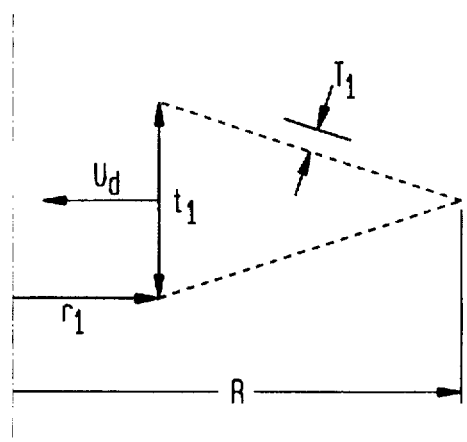
FIG. 29 illustrates the parameters and nomenclature used to calculate the pressure drop and debris bed buildup.

An advantage of both the preferred embodiment 100 and the tapered disk embodiment 300 is that the pressure drop across each disk 302a–302f is the same as the fiber builds up on each disk. Therefore the fiber builds up similarly on each disk over time. FIG. 29 is a schematic view of a typical tapered disk and the relevant nomenclature.

The mass of debris that builds up on the disk is $$M_1=T_1\rho_1 2\pi(R^2-r_1^2)$$

and it builds up at a rate of:

$$dM_1/d\theta=CU_d t_1 2\pi r_1$$

where C is the concentration of the mass of debris per volume of fluid in the fluid surrounding the strainer and $\theta$ is time.

The head loss, $\Delta h_1$, across the debris bed is linearly proportional to the thickness of the debris, $T_1$, and the velocity through the bed, $U_1$, and can be written as:

$$\Delta h_1=kU_1 T_1$$

where k is a constant. Noting that $U_1$ is related to $U_d$ which is independent of time by:

$$U_1 2\pi(R^2-r_1^2)=U_d t_1 2\pi r_1$$

Substituting into the head loss equation and integrating in time yields $$\Delta h_1=(kU_d r_1^2 t_1^2 C\theta)/(\rho_1(R^2-r_1^2)^2)$$

Now k, $U_d$, C and $\rho_1$ are the same for all disks, therefore the head loss will build up the same for each disk since the thickness and radius for each disk vary according to $$t_n \sim (R^2-r_n^2)/r_n$$

Figure 30:
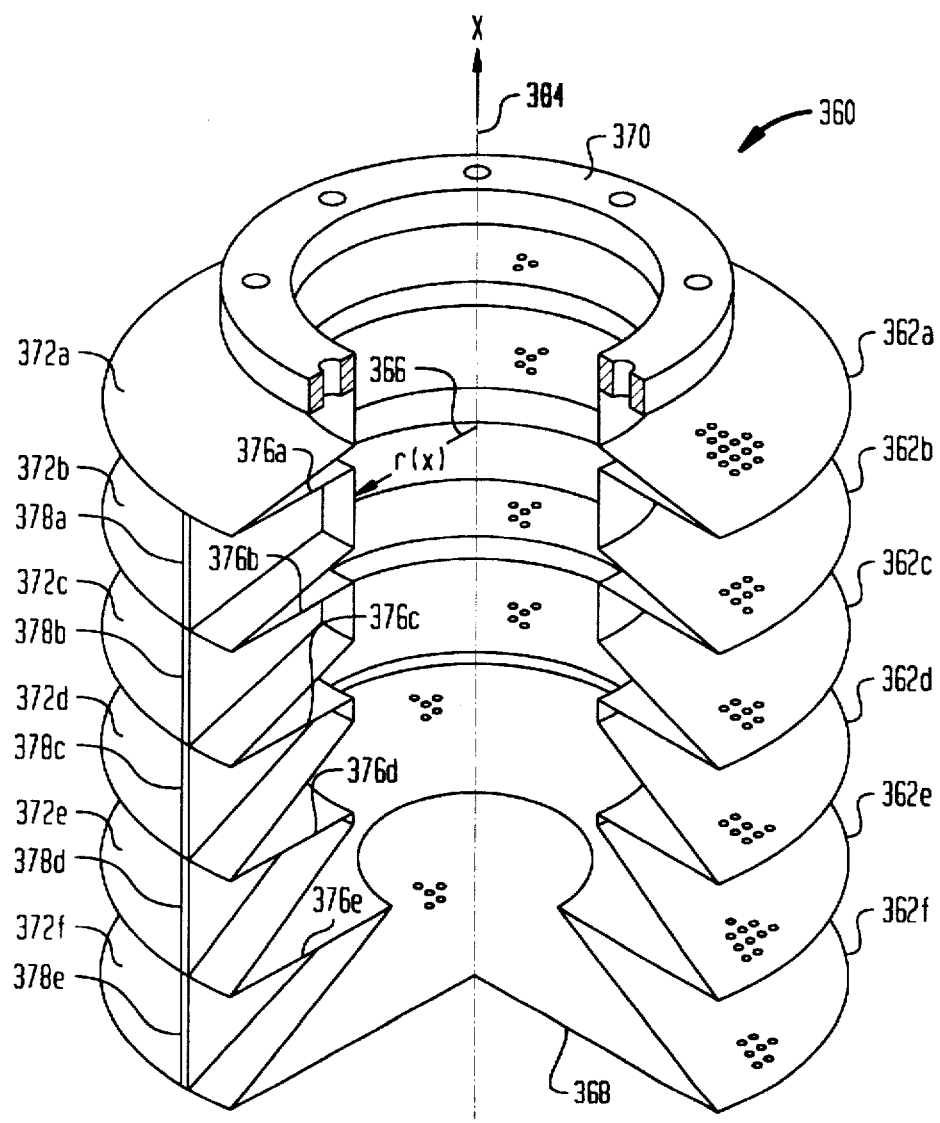
FIG. 30 illustrates an embodiment of the invention in which support plates are placed between the stacked disks and wherein the plates are preferably equally spaced.

Lastly, it may be possible to reduce head loss across a debris bed as well as to improve the structural strength of a strainer by the addition of external supports 378a–378e such as illustrated in FIG. 30. The external supports 378a–378e are illustrated in the context of a tapered disk embodiment 360 but it will be appreciated by those of ordinary skill in the art that it can be employed with the other embodiments as well. Tapered disk embodiment 360 includes a plurality of tapered disks 362a–362f. Each tapered disk 362a–362f includes a forward facing surface 372a–372f and a rearward facing surface 376a–376e. Embodiment 360 includes a central x axis 364 and an internal radius r(x) 366 which decreases with distance from the suction flange 370. An end plate 368 defines the distal extreme from the suction flange 370. External supports 378a–378e are preferably plates parallel to the center line 364. The supports could comprise other structural elements such as rods, etc. The space between the external supports 378a–378e gets smaller as the smaller strainer radii prevent the debris from packing as tightly. The looser packed debris incurs a smaller pressure drop. The number and spacing of the external supports 378a–378e depends upon the debris packing characteristics and the inherent structural strength of the strainer 360.

While the invention has been described with reference to the preferred embodiment thereof, it will be appreciated by those of skill in the art that various changes may be made to the structure and elements of the invention, without departing from the spirit and scope thereof.

We claim:

1. A suction strainer apparatus for straining water from the emergency suppression water source of a nuclear reactor, said strainer apparatus comprising:
   an intake;
   a plurality of stacked, perforated disks having a central core communicating with said intake, said central core having a central axis and an internal, minimum radius r(x) between said central axis and said disks,
   wherein said radius r(x) decreases with distance from said intake.

2. The apparatus of claim 1 wherein the thickness of said disks varies with respect to distance from said intake.

3. The apparatus of claim 2 wherein the thickness of said disks increase with increased distance from said intake.

4. The apparatus of claim 3 wherein said disks include a first surface facing substantially in the direction of said intake, and a second surface connected to said first surface and facing substantially away from said intake.

5. The apparatus of claim 4 further including a third surface circumferentially connecting said first and second surfaces together and defining the maximum exterior diameter of said strainer apparatus from said central axis $C_L$ for any given vertical direction x.

6. The apparatus of claim 5 wherein the exterior diameter of said disks is substantially constant along the length of said strainer apparatus as measured with respect to its central axis.

7. The apparatus of claim 5 wherein the exterior diameter of said strainer apparatus varies with respect to distance along its central axis.

8. The strainer apparatus of claim 6 further comprising:
   reinforcing element means located between said disks for providing additional structural support to said strainer apparatus.

9. The apparatus of claim 4 wherein said disks have a tapered profile.

10. The apparatus of claim 5 wherein r(x) decreases exponentially with increased distance from said intake.

11. The apparatus of claim 5 wherein r(x) decreases linearly with increased distance from said intake.

12. The apparatus of claim 4 wherein the velocity of fluid from said nuclear reactor water source through said central core is substantially constant as r(x) varies.

13. The apparatus of claim 5 wherein r(x) decreases substantially linearly and exponentially with increased distances from said intake.

14. The apparatus of claim 9 wherein r(x) decreases exponentially with increased distance from said intake.

15. The apparatus of claim 9 wherein r(x) decreases linearly with increased distance from said intake.

16. The apparatus of claim 9 wherein r(x) decreases substantially linearly and exponentially with increased distance from said intake.

17. The apparatus of claim 9 wherein the square of r(x) varies exponentially with increased distance from said input.

18. The apparatus of claim 5 wherein the relationship between the inner radius r(x) of the disks and the distance along the axis of the strainer X is determined by:

$$\frac{r(x) - r(0) - \frac{1}{2} \frac{R^2 - r^2(L)}{r(L)t(L)} \ln\left(\frac{R^2 - r^2(x)}{R^2 - r^2(0)}\right)}{r(L) - r(0) - \frac{1}{2} \frac{R^2 - r^2(L)}{r(L)t(L)} \ln\left(\frac{R^2 - r^2(L)}{R^2 - r^2(0)}\right)} = \frac{x}{L}$$

where

R=the outer radius
r(0)=the strainer base radius
r(L)=the suction flange radius
t(L)=the minimum disk thickness
L=the length of the strainer
l=the constant disk spacing and the thickness t(x) of the disks is determined by:

$$\frac{t(x)}{t(L)} = \left(\frac{R^2 - r^2(x)}{R^2 - r^2(0)}\right)\frac{r(L)}{r(x)}.$$

19. The apparatus of claim 9 wherein the relationship between the inner radius r(x) of the disks and the distance along the axis of the strainer X is determined by:

$$\frac{R^2 - r^2(x)}{R^2 - r^2(L)} = \exp\left(\frac{-2U}{lU_c}(x - L)\right) \quad t(x) < l$$

$$r(x) = \frac{U_d}{U} x + r(0) \quad t(x) \geq l$$

R=the outer radius
r(x)=internal core radius
r(0)=the strainer base radius
r(L)=the suction flange radius
t(L)=the minimum disk thickness at the inner radius
L=the length of the strainer
l(x)=the constant disk spacing as long as t(x)<l
α=angle of strainer top and bottom surfaces with respect to plane perpendicular to center line x
U=outside fluid velocity
$U_a$=approach velocity
$U_d$=disk velocity
$U_c$=core velocity and the thickness t(x) of the disks is determined by:

$$\frac{t(x)}{t(L)} = \left(\frac{R^2 - r^2(x)}{R^2 - r^2(0)}\right)\frac{r(L)}{r(x)}.$$

* * * * *